US011361303B2

(12) United States Patent
Shetty et al.

(10) Patent No.: US 11,361,303 B2
(45) Date of Patent: Jun. 14, 2022

(54) METHOD AND SYSTEM FOR FACILITATING SECURE PAYMENT TRANSACTIONS

(71) Applicant: Mastercard International Incorporated, Purchase, NY (US)

(72) Inventors: Kaushal Naveen Shetty, Thane (IN); Ajay Sinha, Pune (IN); Rajesh Krishna Sadanand, Bangalore (IN); Sachin Kumar Singh, Pune (IN)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 17/343,849

(22) Filed: Jun. 10, 2021

(65) Prior Publication Data

US 2022/0044223 A1 Feb. 10, 2022

(30) Foreign Application Priority Data

Aug. 6, 2020 (IN) .............................. 202021033696

(51) Int. Cl.
*G06Q 20/32* (2012.01)
*G06Q 20/02* (2012.01)
*H04L 67/306* (2022.01)
*G06Q 40/02* (2012.01)

(52) U.S. Cl.
CPC .......... *G06Q 20/327* (2013.01); *G06Q 20/02* (2013.01); *G06Q 20/326* (2020.05); *G06Q 40/02* (2013.01); *H04L 67/306* (2013.01)

(58) Field of Classification Search
None
See application file for complete search history.

(56) References Cited

U.S. PATENT DOCUMENTS 8,825,532 B1 * 9/2014 Wong .................. G06Q 20/386
                                                    235/382

FOREIGN PATENT DOCUMENTS

CN           104850988           7/2018

OTHER PUBLICATIONS

J. Niu, F. Gu, R. Zhou, G. Xing and W. Xiang, "VINCE: Exploiting visible light sensing for smartphone-based NFC systems," 2015 IEEE Conference on Computer Communications (INFOCOM), 2015, pp. 2722-2730, doi: 10.1109/INFOCOM.2015.7218664. (Year: 2015).*

* cited by examiner

*Primary Examiner* — Namrata Boveja
*Assistant Examiner* — Carol A See
(74) *Attorney, Agent, or Firm* — Hovey Williams LLP

(57) ABSTRACT

A method for facilitating payment transactions includes receiving, by a server, a flash code request indicative of a transaction amount. A flash code associated with the transaction amount is communicated by the server to the payer device. The flash code is encoded into a flash pattern at the payer device and communicated to a payee device of a payee for executing a payment transaction between the payer and the payee. A first request for the payment transaction is received by the server from the payee device. The first request includes the flash code obtained by decoding the flash pattern at the payee device. The flash code included in the first request is validated by the server. Based on successful validation of the flash code, the transaction amount is deducted from a payer account of the payer and credited to a payee account of the payee.

20 Claims, 16 Drawing Sheets

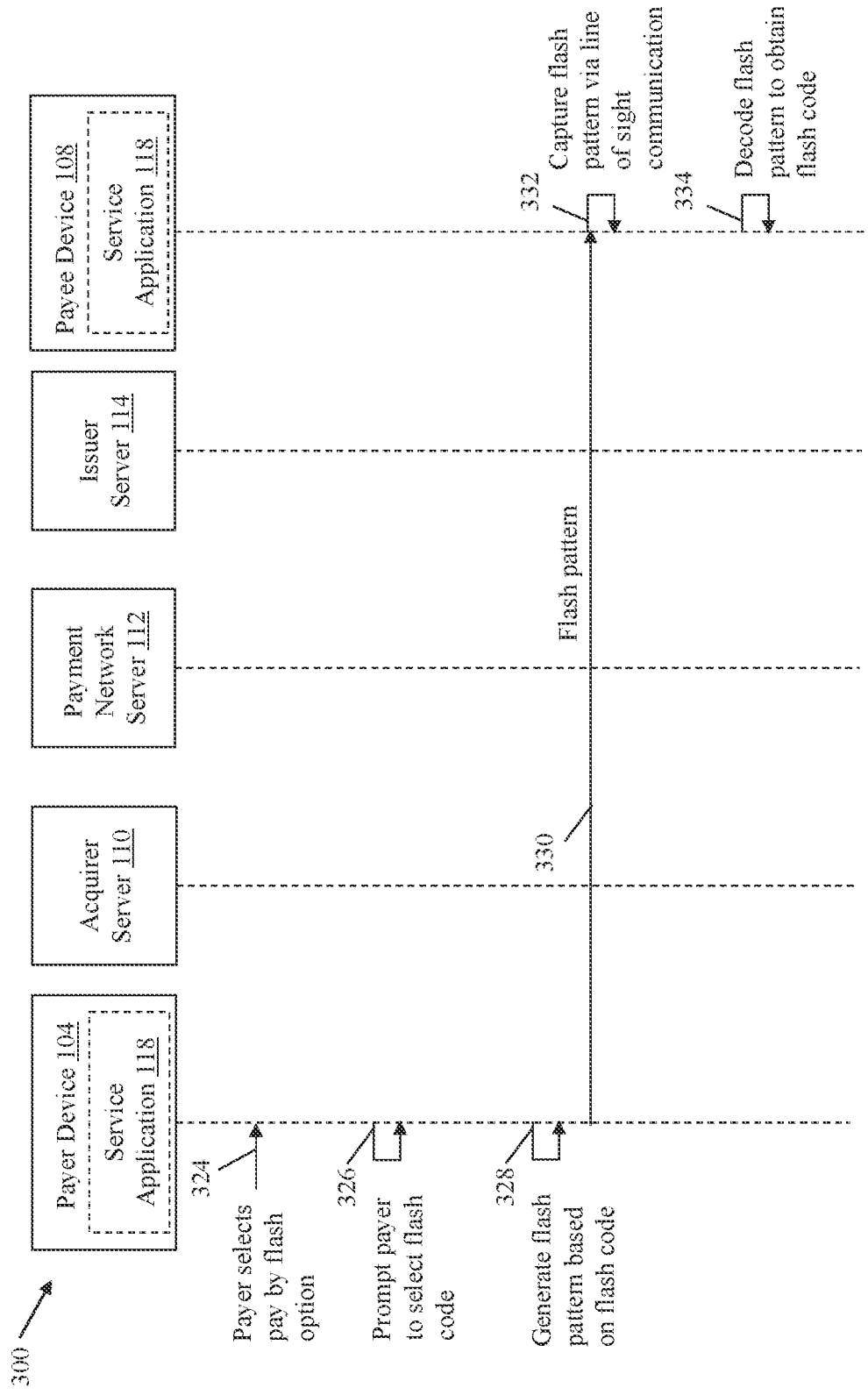

METHOD AND SYSTEM FOR FACILITATING SECURE PAYMENT TRANSACTIONS

CROSS REFERENCE TO RELATED APPLICATIONS

This application claims priority to Indian Application No. 202021033696, filed Aug. 6, 2020, which is incorporated herein by reference in its entirety.

BACKGROUND

Field of the Disclosure

Various embodiments of the present disclosure relate generally to payment transaction systems. More particularly, various embodiments of the present disclosure relate to facilitation of secure payment transactions.

Description of the Related Art

Technological advancements have made digital transactions easier and simpler. As a result, users these days prefer digital transactions over cash transactions for making payments. Generally, the digital transactions involve the use of various payment identifiers, such as registered contact numbers, quick-response (QR) codes, unified payment interface (UPI) identifiers, account numbers, or the like. For example, in order to perform a digital transaction, a payer is either required to obtain one of a QR code, a registered contact number, or a UPI identifier of a payee or provide payer's QR code, registered contact number, or a UPI identifier to the payee.

While the digital transactions are seen as an evolution over the cash transactions, the digital transactions are prone to data misuse and data theft. Thus, in the interest of data security, many times the users (e.g., payers and payees) are not comfortable in sharing their payment identifiers with others and rely on cash transactions instead of digital transactions. However, the idea of a digital world demands the users to go cashless and perform digital transactions worldwide.

In light of foregoing, there exists a need for a technical solution that solves the abovementioned problems and provides secure and seamless mechanism for performing digital transactions without the requirement of sharing sensitive information such as payment identifiers.

SUMMARY

In an embodiment of the present disclosure, a method for facilitating secure payment transactions is provided. The method includes reception of a flash code request indicative of a transaction amount by a server from a payer device of a payer. Based on the flash code request, a flash code associated with the transaction amount is communicated to the payer device by the server. The flash code is encoded into a flash pattern at the payer device and communicated to a payee device of a payee for executing a payment transaction between the payer and the payee. A first request for the payment transaction is received by the server from the payee device. The first request includes the flash code obtained by decoding the flash pattern at the payee device. The flash code included in the first request is validated by the server. Based on successful validation of the flash code, the transaction amount is deducted from a payer account of the payer and credited to a payee account of the payee.

In another embodiment of the present disclosure, a system for facilitating secure payment transactions is provided. The system includes a server that is configured to receive, from a payer device of a payer, a flash code request indicative of a transaction amount. Based on the flash code request, the server is configured to communicate a flash code associated with the transaction amount to the payer device. The flash code is encoded into a flash pattern at the payer device and communicated to a payee device of a payee for executing a payment transaction between the payer and the payee. The server is further configured to receive a first request for the payment transaction from the payee device. The first request includes the flash code obtained by decoding the flash pattern at the payee device. The server is further configured to validate the flash code included in the first request. Based on successful validation of the flash code, the transaction amount is deducted from a payer account of the payer and credited to a payee account of the payee.

In another embodiment of the present disclosure, a method for facilitating secure payment transactions is provided. The method includes hosting, by a payment network server, a service application that is executable on a payer device of a payer and a payee device of a payee. The payment network server is distinct from an issuer of a payer account of the payer. A flash code request indicative of a transaction amount is received by the payment network server from the payer device. The flash code request is initiated by way of the service application. Based on the flash code request, a flash code associated with the transaction amount is communicated to the payer device by the payment network server. The flash code is encoded into a flash pattern at the payer device and communicated to the payee device for executing a payment transaction between the payer and the payee. A first request for the payment transaction is received by the payment network server from the payee device. The first request is initiated by way of the service application and includes the flash code obtained by decoding the flash pattern at the payee device. The flash code included in the first request is validated by the payment network server. Based on successful validation of the flash code, the payment transaction is processed, and the transaction amount is deducted from a payer account of the payer and credited to a payee account of the payee.

BRIEF DESCRIPTION OF DRAWINGS

The accompanying drawings illustrate the various embodiments of systems, methods, and other aspects of the disclosure. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Various embodiments of the present disclosure are illustrated by way of example, and not limited by the appended figures, in which like references indicate similar elements:

FIGS. 3A, 3B, and 3C, collectively represent a process flow diagram that illustrates facilitation of a secure payment transaction between the payer and the payee by an issuer server of FIG. 1, in accordance with another exemplary embodiment of the present disclosure;

Figure 1:
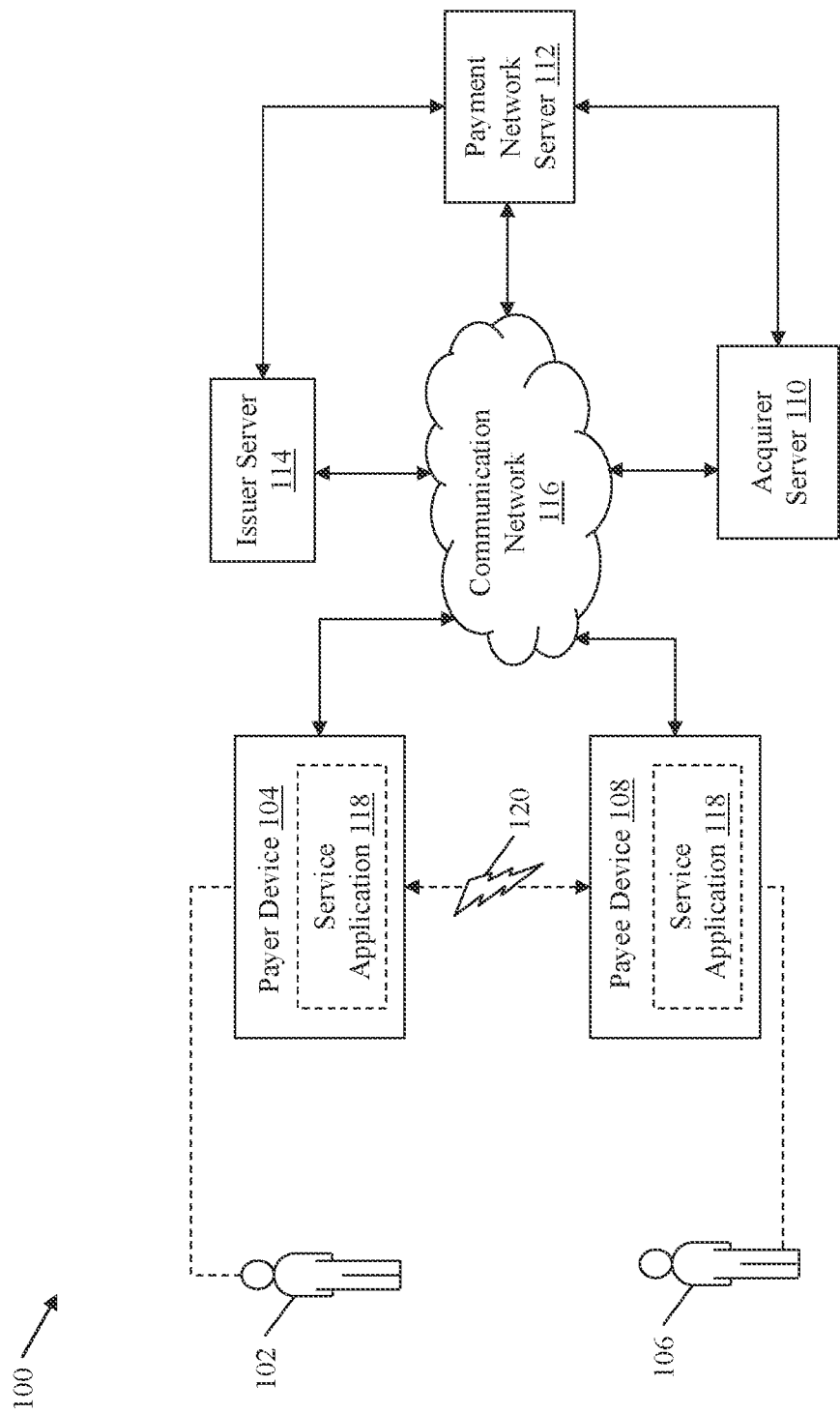
FIG. 1 is a block diagram that illustrates an exemplary environment for facilitating secure payment transactions, in accordance with an exemplary embodiment of the present disclosure.

Further areas of applicability of the present disclosure will become apparent from the detailed description provided hereinafter. It should be understood that the detailed description of exemplary embodiments is intended for illustration purposes only and is, therefore, not intended to necessarily limit the scope of the present disclosure.

DETAILED DESCRIPTION OF EMBODIMENTS

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Overview

In the interest of data security, many times users (e.g., payers and payees) do not prefer sharing their payment identifiers for payment transactions (e.g., contact numbers, Quick Response codes, unified payment interface (UPI) identifiers, or account numbers) with strangers, and instead rely on cash payments. However, the idea of a digital world demands the users to go cashless and perform digital transactions worldwide.

Various embodiments of the present disclosure provide a method and a system that solve the abovementioned problems by facilitating secure digital payment transactions. The system includes a server (e.g., an issuer server or a payment network server) that hosts a service application for offering a payment transaction service to payers and payees. The server receives a registration request from a payer device of a payer, who wants to register for the payment transaction service. During registration, the server links a payer account of the payer with a payer identifier (e.g., contact number, an email identifier, or the like). Upon registration, the payer accesses the service application on the payer device and initiates a flash code request to obtain a flash code of a specific transaction amount from the server. The server receives the flash code request, and communicates a first flash code associated with the specific transaction amount to the payer device. The first flash code is communicated to the payer device when an available account balance of the payer account is sufficient to cover the specific transaction amount. In one embodiment, the first flash code may be similar to regular transaction codes such as one-time passwords (OTPs) or numeric tokens. In another embodiment, the first flash code may be a mixed character code (i.e., letters, numerals, and special characters) that may be different from the regular transaction codes such as OTPs or numeric tokens. The first flash code is exclusive of the details of the payer account and the payer identifier, and is valid for a first time-interval after the generation. The first flash code is stored in a memory of the payer device. When the payer wants to execute a payment transaction with a payee using the first flash code, the first flash code is encoded into a flash pattern at the payer device, which is then communicated to a payee device of the payee. The first flash code is encoded into the flash pattern by controlling various flash parameters based on the first flash code, various environmental factors, and available battery percentage of the payer device. The flash parameters include ambient exposure compensation, flash exposure compensation, flash exposure, flash ratio, flash flickering duration, and time interval between each flash of the flash pattern. The payee device captures and decodes the communicated flash pattern to obtain the first flash code. The payee device then generates a first request including the first flash code for executing the payment transaction. The server receives the first request and validates the first flash code included in the first request. Based on successful validation of the first flash code, the payment transaction is processed and the transaction amount is deducted from the payer account and credited to a payee account of the payee.

Thus, the present disclosure eliminates the need for the payer and the payee to share their payment identifiers with each other for executing a digital payment transaction.

Terms Description (in Addition to Plain and Dictionary Meaning)

Payment transaction is an exchange of funds between two or more parties. For example, the payment transaction may include transferring a transaction amount from a payer's account to a payee's account. In one example, the payment transaction is a peer-to-peer digital transaction.

Flash code refers to a unique code that is associated with a specific amount and has a limited validity period. During the limited validity period, the flash code is used by a corresponding owner to perform a digital payment transaction for the specific amount. The flash code is independent of or exclusive of any account details or payment identifiers of the owner. The flash code may be a numeric code, an alphabetic code, an alphanumeric code, or a mixed character code that includes one or more letters, numerals, and special characters.

Payer device is an electronic communication device that enables a payer to request for a flash code for a payment transaction. The payer device further enables the payer to communicate the flash code encoded into a flash pattern to a payee for performing the payment transaction. The payer device is integrated with a flash mechanism (e.g., a light emitting diode or a screen flash) that generates the flash pattern based on the flash code. Examples of the payer device include a mobile phone, a laptop, a smartphone, a tablet, a phablet, and/or the like.

Flash pattern is a light pattern generated and emitted by a payer device of a payer based on a flash code received by the payer device. For example, the flash code is encoded into the flash pattern, such that a sequence of flash and no flash regions in the flash pattern is indicative of the flash code. Thus, for different flash codes different flash patterns are generated. The flash pattern is communicated from the payer device to a payee device of a payee for executing a peer-to-peer payment transaction between the payer and the payee.

Payee device is an electronic communication device that enables a payee to receive a flash code encoded into a flash pattern from a payer for a payment transaction. The payee device is integrated with a flash capturing mechanism (e.g., a scanner, an image capturing device, or the like) that enables the payee device to capture or record the flash pattern generated or communicated by a payer device. The payee device further enables the payee to use the flash code for completing the payment transaction. Examples of the payee device include a mobile phone, a laptop, a smartphone, a tablet, a phablet, and/or the like.

Service application is an application program that runs on a mobile device of a payer or a payee. The service application is hosted by a server. The service application is capable of controlling the mobile device to emit a flash pattern that is encoded with a flash code. For encoding the flash code into the flash pattern, the service application controls various flash parameters, such as ambient exposure compensation, flash exposure compensation, flash exposure, flash ratio, flash flickering duration, and time interval between each flash of the flash pattern. The service application is further capable of controlling the mobile device to decode a captured flash pattern to obtain the flash code.

Flash code request is a request initiated by a payer to obtain a fixed amount flash code for performing a payment transaction. The flash code request includes details pertaining to the amount that is to be associated with the flash code and a payment identifier of the payer.

First request is a transaction request initiated by a payee to complete a payment transaction with a payer using a flash code communicated by the payer to the payee. The first request includes the flash code, a payment identifier of the payee, and a transaction amount of the payment transaction. In one example, the first request further includes a new data element that distinguishes the first request from regular transaction requests.

A server is a physical or cloud data processing system on which a server program runs. The server may be implemented as hardware or software, or a combination thereof. The server may correspond to one of a payment network server, an issuer server, or an acquirer server. The server executes various programs required for processing a payment transaction.

FIG. 1 is a block diagram that illustrates an exemplary environment 100 for facilitating secure payment transactions, in accordance with an exemplary embodiment of the present disclosure. The environment 100 includes a payer 102 having a payer device 104, a payee 106 having a payee device 108, an acquirer server 110, a payment network server 112, and an issuer server 114. The payer and payee devices 104 and 108, the acquirer server 110, the payment network server 112, and the issuer server 114 may communicate with each other by way of a communication network 116 or through separate communication networks established therebetween.

The payer 102 is an account holder of a payer account maintained at a financial institution, such as an issuer. The payer 102 may utilize the payer device 104 for performing payment transactions from the payer account. Examples of the payer account may include a savings account, a current account, a debit account, a credit account, a digital wallet account, or the like.

The payer device 104 is a computing device of the payer 102. Examples of the payer device 104 include, but are not limited to, a mobile phone, a laptop, a smartphone, a tablet, and a phablet. The payer device 104 is utilized by the payer 102 to perform peer-to-peer payment transactions from the payer account. The payer device 104 is used by the payer 102 to request for a flash code that is linked to (or loaded with) a specific amount from the payer account. The payer device 104 is further configured to receive and store the requested flash code in a memory thereof. The payer device 104 includes a flash generation mechanism (for example, a high-brightness light emitting diode (LED) or screen flash) for generating and emitting flash light. In one embodiment, the payer device 104 is utilized by the payer 102 to communicate the received flash code to the payee 106 for performing a payment transaction. For communicating the flash code to the payee 106, the payer device 104 is configured to generate a flash pattern 120 that is encoded with the flash code. Upon generation, the flash pattern 120 is recorded or captured by the payee device 108. The payer device 104 is further configured to run a service application 118 using which the payer 102 initiates a flash code request for requesting the flash code. Further, the payer device 104 encodes the received flash code into the flash pattern 120 under the control of the service application 118. Functional details of various components of the payer device 104 are described in conjunction with FIG. 4.

The payee 106 is an account holder of a payee account maintained at a financial institution, such as an acquirer. The payee 106 may utilize the payee device 108 for performing payment transactions from the payee account. Examples of the payee account may include a savings account, a current account, a debit account, a credit account, a digital wallet account, or the like. In one embodiment, the issuer maintaining the payer account may be same as the acquirer maintaining the payee account. In another embodiment, the issuer maintaining the payer account may be different from the acquirer maintaining the payee account.

The payee device 108 is a computing device of the payee 106. Examples of the payee device 108 include, but are not limited to, a mobile phone, a laptop, a smartphone, a tablet, and a phablet. The payee device 108 is utilized by the payee 106 to perform peer-to-peer payment transactions from the payee account. The payee device 108 is used by the payee 106 to receive the flash code from the payer 102 for the payment transaction. The payee device 108 includes a flash capturing mechanism (for example, an image capturing device, a scanner, or the like) for capturing the flash pattern 120 emitted by the payer device 104. The payee device 108 is further configured to decode the captured flash pattern 120 for obtaining the flash code. The payee device 108 is further configured to run the service application 118 that decodes the captured flash pattern 120 to obtain the flash code. The payee device 108 is further configured to communicate a first request including the obtained flash code to the payment network server 112 or the acquirer server 110 for processing the payment transaction between the payer 102 and the payee 106. Functional details of various components of the payee device 108 are described in conjunction with FIG. 4.

The acquirer server 110 is a server arrangement which includes suitable logic, circuitry, interface, and/or code, executable by the circuitry, for processing payment transactions associated with the payee account. The acquirer server 110 is operated by the acquirer maintaining the payee account. The acquirer server 110 communicates with the payment network server 112 and the issuer server 114 for processing the payment transactions.

The payment network server 112 is a server arrangement which includes suitable logic, circuitry, interface, and/or code, executable by the circuitry, for processing payment transactions. The payment network server 112 is operated by a payment network (i.e., a payment interchange). The payment network server 112 represents an intermediate entity between the issuer server 114 and the acquirer server 110 for processing the payment transactions. In one embodiment, the payment network server 112 is configured to host the service application 118 that offers a convenient and secure means for performing digital payment transactions. By hosting the service application 118, the payment network server 112 eliminates the need to share payment identifiers (e.g., registered contact numbers, quick-response (QR) codes, and payment account details) between the payer 102 and the payee 106 for performing digital payment transactions. In such an embodiment, the payment network server 112 is configured receive the flash code request from the payer device 104 and communicate the flash code to the payer device 104. The payment network server 112 is further configured to store the flash code in a memory thereof. The payment network server 112 is further configured to receive, from the payee device 108, the first request including the decoded flash code for executing the payment transaction between the payer 102 and the payee 106. The payment network server 112 is further configured to validate the flash code included in the first request. Based on successful validation of the flash code, the payment transaction is processed. Functional details of various components of the payment network server 112 are described in conjunction with FIG. 5.

The issuer server 114 is a server arrangement which includes suitable logic, circuitry, interface, and/or code, executable by the circuitry, for processing various payment transactions. The issuer is a financial institution that manages the payer account. The issuer server 114 is configured to receive the flash code request initiated by the payer 102 and generate the flash code.

In one embodiment, the issuer server 114 receives the flash code request from the payer device 104 through the payment network server 112 and communicates the flash code to the payer device 104 through the payment network server 112. Based on successful validation of the flash code included in the first request, the issuer server 114 is configured to receive a funds transfer request from the payment network server 112 for processing the payment transaction between the payer 102 and the payee 106. For processing the payment transaction, the issuer server 114 deducts a transaction amount linked to the flash code from the payer account. The deducted transaction amount is credited to the payee account.

In another embodiment, the issuer server 114 is configured to host the service application 118 executable on the payer and payee devices 104 and 108. In such an embodiment, the issuer server 114 directly receives the flash code request from the payer device 104 and communicates the flash code to the payer device 104. The issuer server 114 further receives the first request from the payment network server 112 for validating the flash code included in the first request. Based on successful validation of the flash code, the issuer server 114 deducts the transaction amount linked to the flash code from the payer account. Functional details of various components of the issuer server 114 are described in conjunction with FIG. 6.

Examples of the acquirer server 110, the payment network server 112, and the issuer server 114 may include, but are not limited to, computers, laptops, mini-computers, mainframe computers, any non-transient and tangible machines that may execute a machine-readable code, cloud-based servers, distributed server networks, a network of computer systems, or a combination thereof.

The communication network 116 is a medium through which content and messages are transmitted between the payer device 104, the payee device 108, the acquirer server 110, the payment network server 112, and/or the issuer server 114. Examples of the communication network 116 include, but are not limited to, a Wi-Fi network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and combinations thereof. Various entities in the environment 100 may connect to the communication network 116 in accordance with various wired and wireless communication protocols, such as Transmission Control Protocol and Internet Protocol (TCP/IP), User Datagram Protocol (UDP), Long Term Evolution (LTE) communication protocols, or any combination thereof.

Figure 2A:
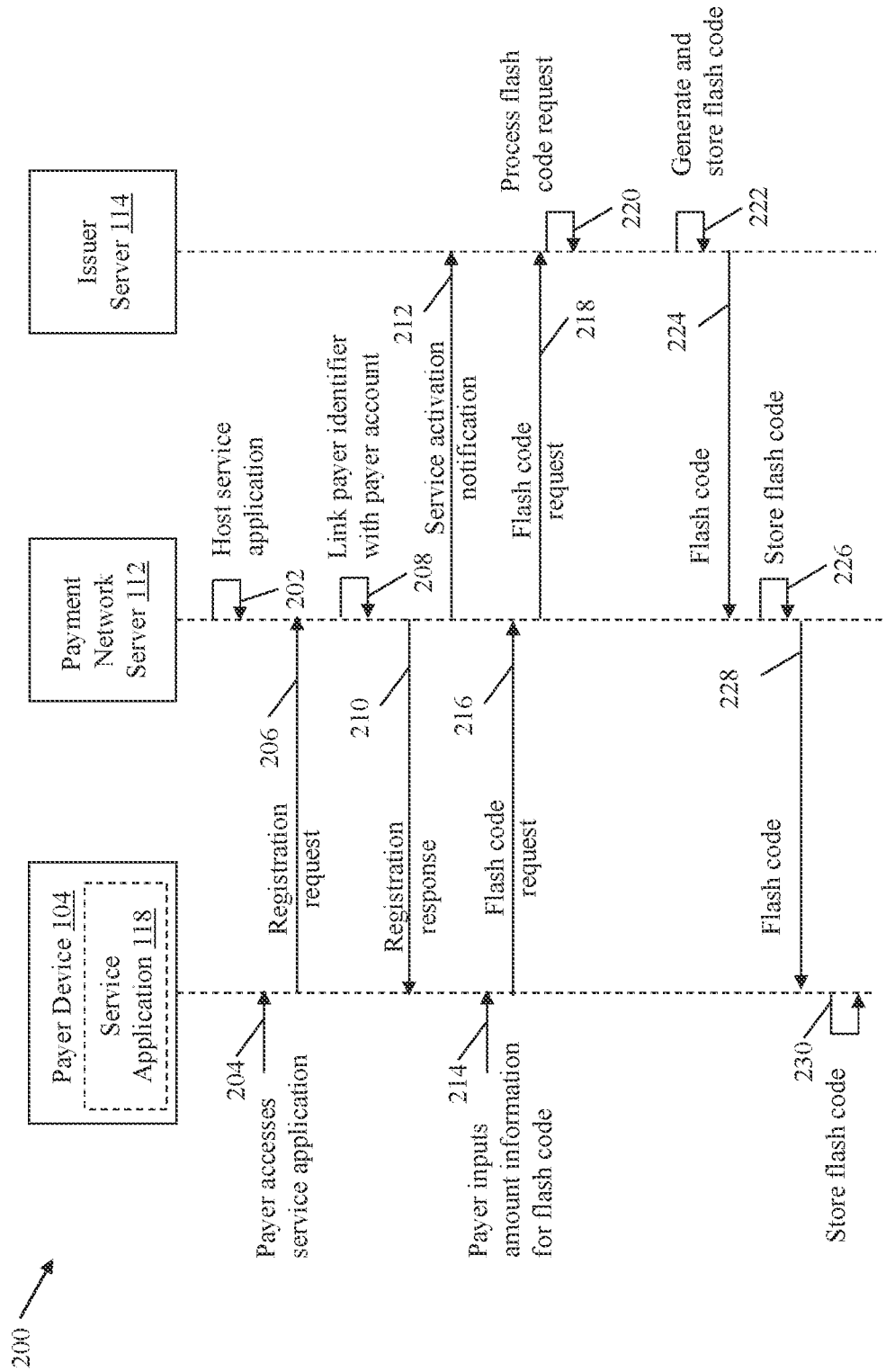
FIGS. 2A, 2B, and 2C, collectively represent a process flow diagram that illustrates facilitation of a secure payment transaction between a payer and a payee by a payment network server of FIG. 1, in accordance with an exemplary embodiment of the present disclosure.
Figure 2B:
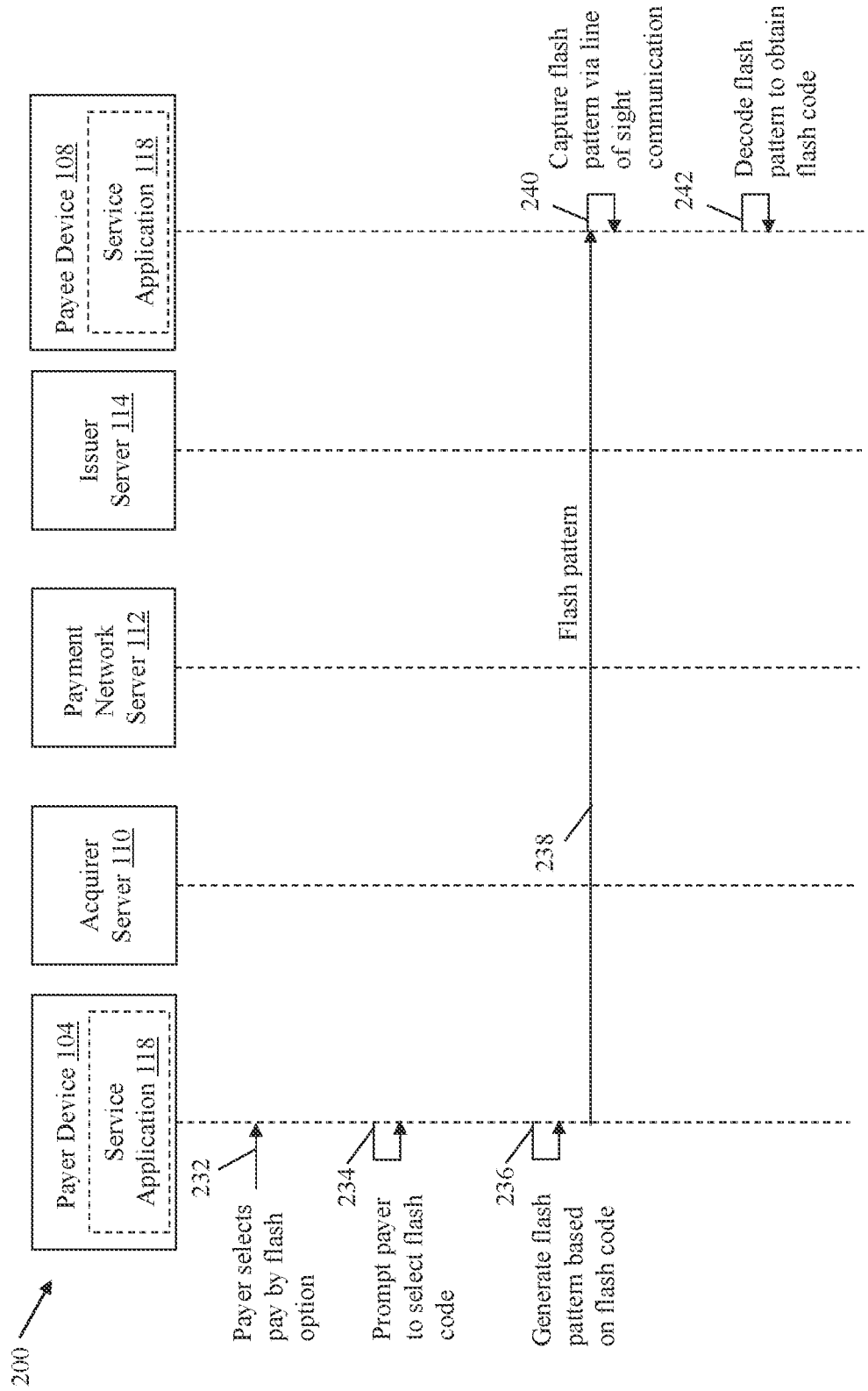
Figure 2C:
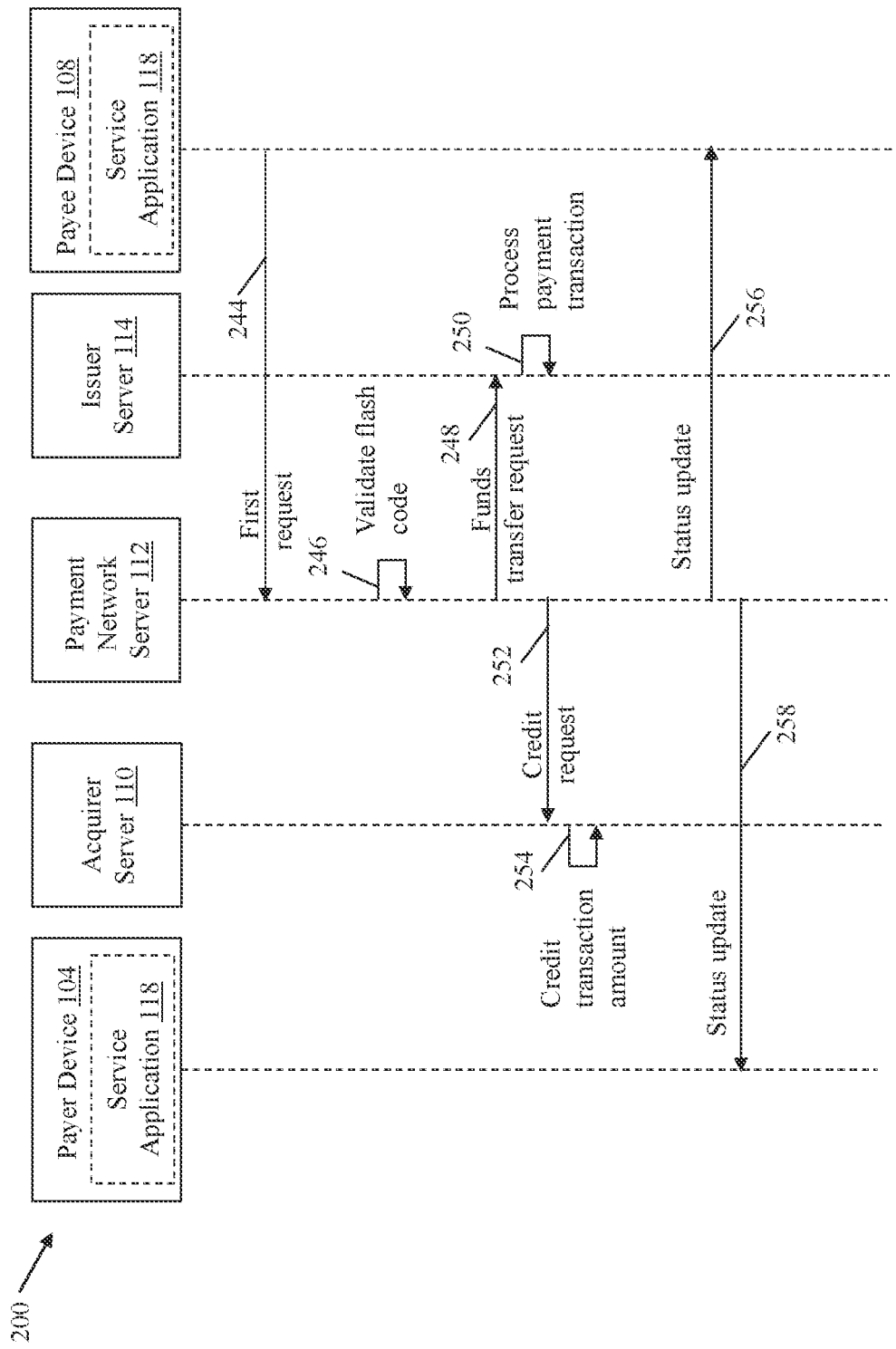

FIGS. 2A, 2B, and 2C, collectively represent a process flow diagram 200 that illustrates facilitation of a secure payment transaction between the payer 102 and the payee 106 by the payment network server 112, in accordance with an exemplary embodiment of the present disclosure. For the sake of ongoing description of FIGS. 2A-2C, it is assumed that the payment network server 112 hosts the service application 118 (as shown by arrow 202).

The payer 102 utilizes the payer device 104 to access the service application 118 running or being executed on the payer device 104 (as shown by arrow 204). In order to register for a payment transaction service offered by the payment network server 112, the payer 102 provides details pertaining to the payer account and a payer identifier (e.g., a registered contact number) to the payer device 104. In one example, when the service application 118 is accessed by the payer 102, a user interface (UI) of the service application 118 is presented on a display of the payer device 104. The UI prompts the payer 102 to provide the details of the payer account and the payer identifier.

When the payer 102 successfully submits the details of the payer account and the payer identifier, a registration request is communicated from the payer device 104 executing the service application 118 to the payment network server 112 (as shown by arrow 206). The registration request is indicative of the details of the payer account and the payer identifier. Upon receiving the registration request, the payment network server 112 is configured to link the payer account with the payer identifier (as shown by arrow 208) and register the payer 102 for the payment transaction service. In one embodiment, the payment network server 112 is further configured to maintain a first database that stores data of users (e.g., the payer 102 or the payee 106) who have registered for the payment transaction service. For example, when the payer 102 is registered for the payment transaction service, the payment network server 112 updates the first database to store the details of the payer account linked to the payer identifier. For notifying the payer 102 regarding the successful registration, the payment network server 112 is configured to communicate a registration response to the payer device 104 (as shown by arrow 210). In one example, the registration response is communicated to the payer device 104 as a push notification on the service application 118. Using the details of the payer account, the payment network server 112 identifies the issuer that maintains the payer account of the payer 102. Upon identification of the issuer, the payment network server 112 is configured to communicate a service activation notification to the issuer server 114 to notify that the payment transaction service has been activated for the payer 102 (as shown by arrow 212). Upon registration, the payer 102 may avail the payment transaction service through the service application 118 as per requirement. The payment transaction service once enabled allows the payer 102 to perform peer-to-peer digital transactions by requesting a special type of code (i.e., a flash code) from the payment network server 112.

It will be apparent to a person of ordinary skill in the art that registering for the payment transaction service (as shown by arrows 204-212) is a one-time process for the payer 102. Similarly, the payee 106 may also have registered for the payment transaction service using the service application 118 running on the payee device 108.

The payer 102 accesses the service application 118 to avail the payment transaction service. For example, the UI of the service application 118 may present a flash code option to the payer 102. The payer 102 may select the flash code option to request the payment network server 112 for a fixed amount flash code. Based on the selection of the flash code option by the payer 102, the UI of the service application 118 prompts the payer 102 to input amount information for generating the fixed amount flash code from the payer account. The payer 102 inputs the amount information (for example, $200) to the payer device 104 (as shown by arrow 214). Upon receiving the amount information, the service application 118 executed on the payer device 104 initiates a flash code request that is indicative of the payer identifier and the amount (i.e., $200). In one example, the amount is equal to a transaction amount of a payment transaction that the payer 102 wants to perform. The flash code request may further include a first flag that is set to indicate the selection of the flash code option. The payer device 104 is configured to communicate the flash code request to the payment network server 112 via the communication network 116 (as shown by arrow 216).

The payment network server 112 receives the flash code request and determines whether the payment transaction service is activated for the payer 102. For example, the payment network server 112 may look-up the first database to determine whether the payment identifier indicated by the flash code request is stored in the first database. When the payment identifier is determined to be stored in the first database, the payment network server 112 establishes that the payment transaction service is activated for the payer 102. The payment network server 112 then communicates the flash code request to the issuer server 114 (as shown by arrow 218).

The issuer server 114 receives the flash code request and processes the flash code request (as shown by arrow 220). During the processing of the flash code request, the issuer server 114 determines whether the payer account of the payer 102 has sufficient funds (e.g., available account balance or credit line) to cover the amount indicated by the flash code request. In one example, the payer account may have insufficient funds. In such a scenario, the issuer server 114 declines the flash code request and notifies the payment network server 112, which in turn notifies the payer 102. In a non-limiting example, it is assumed that the payer account has sufficient funds (e.g., available account balance or credit line) to cover the amount. In such a scenario, the issuer server 114 approves the flash code request. The issuer server 114 may be further configured to check whether the first flag in the flash code request is set or reset. In a scenario, where the first flag is set, the issuer server 114 is configured to generate a first flash code for the amount specified by the payer 102 (as shown by arrow 222). In other words, the first flash code is generated by the issuer server 114 based on the flash code request and the available account balance of the payer account. For example, the first flash code may be a numeric code, an alphabetic code, or a mixed character code that is inclusive of various alphanumeric characters and various special characters, such as @, $, +, =, #, or the like. In one embodiment, the first flash code may be of a similar format as regular transaction codes or tokens, such as one-time passwords (OTPs), or dynamic tokens, that the issuer server 114 generates for regular transactions. In another embodiment, the first flash code may be of a different format than the regular transaction codes or tokens, such as OTPs, or dynamic tokens, that the issuer server 114 generates for the regular transactions. In such a scenario, the first flag in the flash code request indicates the issuer server 114 to generate a flash code instead of a regular transaction code. The first flash code is exclusive of the details of the payer account and the payer identifier, and is valid for a first time-interval after the generation. Thus, if not used, the first flash code expires after the first time-interval. In one embodiment, the first flash code is a one-time use code. In another embodiment, the first flash code is a multi-use code that is usable until expiry or the amount associated therewith is exhausted. In one embodiment, the issuer server 114 is configured to block the amount associated with the first flash code from the payer account. The amount remains blocked until the first flash code is used by the payer 102 for a payment transaction or the first time-interval lapses without the first flash code being used. The issuer server 114 is further configured to store the generated first flash code in a second database against the payer account of the payer 102 (as shown by arrow 222). The second database may be an exclusive database where different flash codes are stored.

The issuer server 114 is further configured to communicate the first flash code to the payment network server 112 (as shown by arrow 224). The payment network server 112 stores the received first flash code in the first database against the payer identifier of the payer 102 (as shown by arrow 226), and communicates the first flash code to the payer device 104 (as shown by arrow 228). The payer device 104 presents the received first flash code to the payer 102 and stores the first flash code in a memory thereof (as shown by arrow 230). The first flash code may be received by the payer device 104 as a push notification on the service application 118. In one embodiment, multiple flash codes of different denominations (i.e., different amounts) may be stored in the memory of the payer device 104. The payer 102 may utilize any of the stored flash codes for making payment transactions.

In another embodiment, the flash code request may be communicated to the payment network server 112 from the payer device 104 using unstructured supplementary service data (USSD) technique. The payment network server 112 may partner with one or more telecom service providers and allocate a first USSD code (e.g., #440 #Amount #) to flash code requests. Thus, in a scenario where the payer device 104 lacks or has limited Internet access, the payer 102, after registration, may request the generation of the first flash code worth $200 using the first USSD code. For example, the payer 102 may dial the first USSD code, e.g., #440 #200 #, on the payer device 104 and the payer device 104 communicates the first USSD code to the payment network server 112 via a mobile communication channel. Based on the first USSD code received from the registered contact number of the payer 102, the payment network server 112 communicates the flash code request to the issuer server 114 such that the flash flag is set in the flash code request. The payment network server 112 then communicates the first flash code received from the issuer server 114 to the payer device 104. In such a scenario, the first flash code is communicated as a short message service (SMS) message on the registered contact number of the payer 102.

With reference to FIG. 2B, the payer 102 accesses the service application 118 for performing the payment transaction with the payee 106. The service application 118 presents a pay by flash option for performing the payment transaction. The payer 102 selects the pay by flash option (as shown by arrow 232) for performing the payment transaction with the payee 106. Based on the selection of the pay by flash option, the service application 118 identifies various flash codes stored in the memory of the payer device 104 and presents a list of the identified flash codes. In a scenario where no flash code is stored in the memory of the payer device 104, the UI of the service application 118 prompts the payer 102 to initiate a new flash code request for obtaining a new flash code that is associated with the transaction amount of the payment transaction. In other words, flash codes may be requested by the payer 102 for real-time payment transactions.

In a non-limiting example, it is assumed that multiple flash codes are stored in the memory of the payer device 104. Based on the transaction amount of the payment transaction, the payer 102 selects at least one of the multiple flash codes (as shown by arrow 234). In one example, the memory of the payer device 104 has the first flash code of $200 and a second flash code of $100 stored therein and the payer 102 wants to pay $200 to the payee 106. In such a scenario, the payer 102 selects the first flash code associated with the transaction amount (i.e., $200) instead of the second flash code that is associated with $100. In another example, the memory of the payer device 104 has the first flash code of $200 and a third flash code of $300 stored therein and the payer 102 wants to pay $150 to the payee 106. In such a scenario, the payer 102 may select the first flash code associated with $200 instead of the second flash code that is associated with $300. In another exemplary scenario, all flash codes stored in the memory of the payer device 104 may be associated with amounts less than the transaction amount. In such a scenario, the service application 118 may prompt the payer 102 to select more than one flash codes for the payment transaction. In a non-limiting example, it is assumed that the payer 102 selects the first flash code for performing the payment transaction of $200 with the payee 106.

Based on the selection of the first flash code, the service application 118 causes the payer device 104 to generate a flash pattern (for example, the flash pattern 120) that has the selected first flash code encoded therein (as shown by arrow 236). The flash pattern 120 is generated by controlling one or more flash parameters of the flash generation mechanism based on the first flash code, environmental factors (such as time of the day, available ambient light in the surroundings of the payer device 104, or the like), and available battery percentage of the payer device 104. Examples of the flash parameters include, but are not limited to, an ambient exposure compensation, a flash exposure compensation, a flash exposure, a flash ratio, a flash flickering duration, a time interval between each flash of the flash pattern 120, and a flash color of the flash pattern 120.

In one exemplary scenario, the first flash code selected by the payer 102 for performing the payment transaction with the payee 106 is '8Ym6z4AeB1=t". Based on the selection of the first flash code by the payer 102, the payer device 104 is configured to translate the first flash code to binary format. In one embodiment, zeroes of the translated first flash code are represented as regions of no flash and ones of the translated first flash code are represented as flash light, in the flash pattern 120. The service application 118 then causes the payer device 104 to control the flash ratio for the flash pattern 120 based on the translated flash code and the available battery percentage of the payer device 104. For example, the translated first flash code is split into two segments based on a length of the translated first flash code. If the translated first flash code includes 18 digits, the translated first flash code is split into two segments of 9 digits each. The service application 118 then causes the payer device 104 to convert the second segment into a single decimal digit. For example, if the second segment is "011010010111111111", all the digits in the second segment to are added to obtain the single decimal digit, here (0+1+1+0+1+0+0+1+0+1+1+1+1+1+1+1+1=12=>1+2=3). The service application 118 then causes the payer device 104 to utilize the obtained single decimal digit and the available battery percentage of the payer device 104 to control the flash ratio, as shown by equation 1 below. In one example, the flash ratio may lie in the range of [0.0V to +5V]. Thus, if a result of equation 1 is greater than 5, the flash ratio is set to be '+5V' for generating the flash pattern 120.

$$\text{Flash Ratio} = \frac{\text{Single decimal digit}}{\text{Available batery percentage}} \times 10 \quad (1)$$

The service application 118 further causes the payer device 104 to control the flash flickering duration based on the amount of the first flash code and the time of the day (24 Hours format). For example, if the amount of the first flash code is $200 and the time of the day of 14:10 (HH:MM), the flash flickering duration is determined as 2/14 (i.e., the first digit of the amount/HH). The service application 118 further causes the payer device 104 to control the flash exposure based on the flash ratio value, for example, flash exposure= (flash ratio*10)+40. The service application 118 further causes the payer device 104 to control the ambient exposure compensation between [−6 EV to +1 EV] and the flash exposure compensation between [0V to −5 EV]. Thus, based on the sequence of zeroes and ones in the translated first flash code and values of the flash parameters, the flash pattern 120 is generated and emitted by the payer device 104.

In other embodiments, the service application 118 further causes the payer device 104 to control the time interval between each flash based on the amount of the first flash code and the time of the day (24 Hours format). For example, if the amount of the first flash code is $200 and the time of the day is 14:10 (HH:MM), the time interval between each flash is determined as 2*10/14 (i.e., (the first digit of the amount/HH)×10). Thus, each zero of the translated first flash code is represented by the determined time interval between each flash. The service application 118 may further cause the payer device 104 to control a flash color of flash light in the flash pattern 120 based on the first flash code. For example, zeroes of the translated first flash code may be encoded into red colored flash light and ones of the translated first flash code may be encoded into blue colored flash light for generating the flash pattern 120.

It will be apparent to a person of ordinary skill in the art that the abovementioned exemplary scenario is merely described for exemplary purpose and should not be construed limiting to the scope of the disclosure. In other embodiments, the payer device 104 may utilize one or more known techniques in the art to generate the flash pattern 120 based on the first flash code.

The flash pattern 120 is emitted by the payer device 104 using the flash generation mechanism (such as the high-brightness LED, the screen flash, or the like) and the emitted flash pattern 120 is communicated to the payee device 108 (as shown by arrow 238). When there exists line of sight communication between the payer device 104 and the payee device 108, the payee device 108 captures the emitted flash pattern 120 using the flash capturing mechanism such as a scanner, an image capturing device, or the like (as shown by arrow 240). The service application 118 being executed at the payee device 108 causes the payee device 108 to decode the captured flash pattern 120 and obtain the first flash code (as shown by arrow 242). The payee device 108 decodes the flash pattern 120 based on the flash parameters of the flash pattern 120. In one example, the payee device 108 decodes the flash and no flash regions in the captured flash pattern 120 to ones and zeroes and then translates the binary code to obtain the flash code. In another example, the payee device 108 decodes the red and blue flash regions in the captured flash pattern 120 to ones and zeroes, and then translates the binary code to obtain the flash code.

With reference to FIG. 2C, when the flash pattern 120 is decoded, the service application 118 being executed on the payee device 108 generates a first request for executing the payment transaction. The first request includes the first flash code obtained by decoding the flash pattern 120, a payee identifier (e.g., a registered mobile number) of the payee 106, and the transaction amount of the payment transaction. In one embodiment where the first flash code is a multi-use code, the service application 118 may not allow local storage of the decoded first flash code in a memory of the payee device 108 and the decoded first flash code may not be rendered visible to the payee 106. The payee device 108 is configured to communicate the first request to the payment network server 112 (as shown by arrow 244). The first request may include a first data element to indicate that the first request includes a flash code (i.e., the first flash code).

The payment network server 112 receives the first request and based on a value of the first data element in the first request, the payment network server 112 may identify that the first request includes a flash code. The payment network server 112 then validates the first flash code included in the first request (as shown by arrow 246). For validating the first flash code, the payment network server 112 is configured to look-up the first database to determine whether the first flash code is stored in the first database. In one scenario, the first flash code included in the first request may not be stored in the first database. In such scenario, the payment network server 112 declares the first flash code included in the first request as invalid and declines the payment transaction. In another scenario, the first flash code is stored in the first database but may have expired. In such scenario, the payment network server 112 declares the first flash code included in the first request as invalid and declines the payment transaction. In another scenario, the first flash code included in the first request is stored in the first database and is active. In such scenario, the payment network server 112 declares the first flash code included in the first request as valid if the transaction amount is less than or equal to the amount associated with the first flash code. If the transaction amount is greater than the amount associated with the first flash code, the payment network server 112 declares the first flash code included in the first request as invalid and declines the payment transaction. In another embodiment, the payment network server 112 may communicate the first request to the issuer server 114 for the validation of the first flash code and may receive a validation response indicting the result of validation from the issuer server 114.

Based on successful validation of the first flash code, the payment network server 112 communicates a funds transfer request to the issuer server 114 that maintains the payer account (as shown by arrow 248). The funds transfer request includes the details of the payer account, the transaction amount, the first data element, and the validated first flash code. The issuer server 114 receives the funds transfer request and processes the payment transaction (as shown by arrow 250). The transaction amount is deducted from the payer account. The processing (i.e., settlement) of the payment transaction that is based on the first flash code may be different from regular transactions. For example, instead of directly deducting the transaction amount from the payer account, the issuer server 114 is configured to compare the transaction amount with the amount associated with the first flash code. In one example, based on the comparison, the issuer server 114 may identify that the transaction amount is less than the amount associated with the one-time use first flash code. Thus, the issuer server 114 deducts the transaction amount from the blocked amount and the difference between the transaction amount and the amount associated with the first flash code is unblocked and made available to the payer 102 for use. In another example, based on the comparison the issuer server 114 may identify that the transaction amount is less than the amount associated with the multi-use first flash code. Thus, the issuer server 114 deducts the transaction amount from the blocked amount and the difference between the transaction amount and the amount associated with the first flash code remains blocked until the remaining amount is exhausted by the payer 102 or the expiry of the first flash code.

The payment network server 112 is further configured to communicate a credit request to the acquirer server 110 that maintains the payee account (as shown by arrow 252). The acquirer server 110 receives the credit request and credits the transaction amount to the payee account (as shown by arrow 254). The payment network server 112 is further configured to communicate status updates of the successful completion of the payment transaction to the payee device 108 and the payer device 104 (as shown by arrows 256 and 258).

In one embodiment, the payee device 108 may be configured to perform batch processing for multiple transactions (i.e., both regular transactions and transactions based on flash codes). In such embodiments, instead of initiating the first request for a single transaction, the payee device 108 may be configured to initiate a batch processing request. The batch processing request may include multiple requests for transactions i.e., both regular transactions and transactions associated with flash codes. Upon receiving the batch processing request, the payment network server 112 may be configured to distinguish between regular transactions and flash code-based transactions in the batch processing request based on the first data element included in flash code-based transaction requests. The payment network server 112 may be configured to identify those requests in the batch processing request that are associated with flash codes based on the values of the first data element in such requests. The payment network server 112 may then validate the flash code associated with each request and process each transaction based on the result of validation.

In another embodiment, the first request may be communicated to the payment network server 112 from the payee device 108 using USSD technique. The payment network server 112 may partner with one or more telecom service providers and allocate a second USSD code (e.g., #441 #Flash code #Transaction Amount #) to the first request. Thus, in a scenario where the payee device 108 lacks or has limited Internet access, the payee 106, after registration with the payment network server 112, may initiate the first request using the second USSD code. For example, the payee 106 may dial the second USSD code, e.g., #441 #8Ym6z4AeB1=t #200 #, on the payee device 108 and the payee device 108 communicates the second USSD code to the payment network server 112 via a mobile communication channel. Based on the second USSD code received from the registered contact number of the payee 106, the payment network server 112 validates the received flash code for processing the payment transaction.

In another embodiment, the payment network server 112 may offer the payment network service by way of a third-party application, for example, ApplePay®, Samsung Pay®, or the like. In such a scenario, the flash code request is initiated by the payer 102 using the third-party application running on the payer device 104 and communicated to the payment network server 112. Further, the payer device 104 encodes the received flash code into a flash pattern under the control of the third-party application.

Figure 3A:
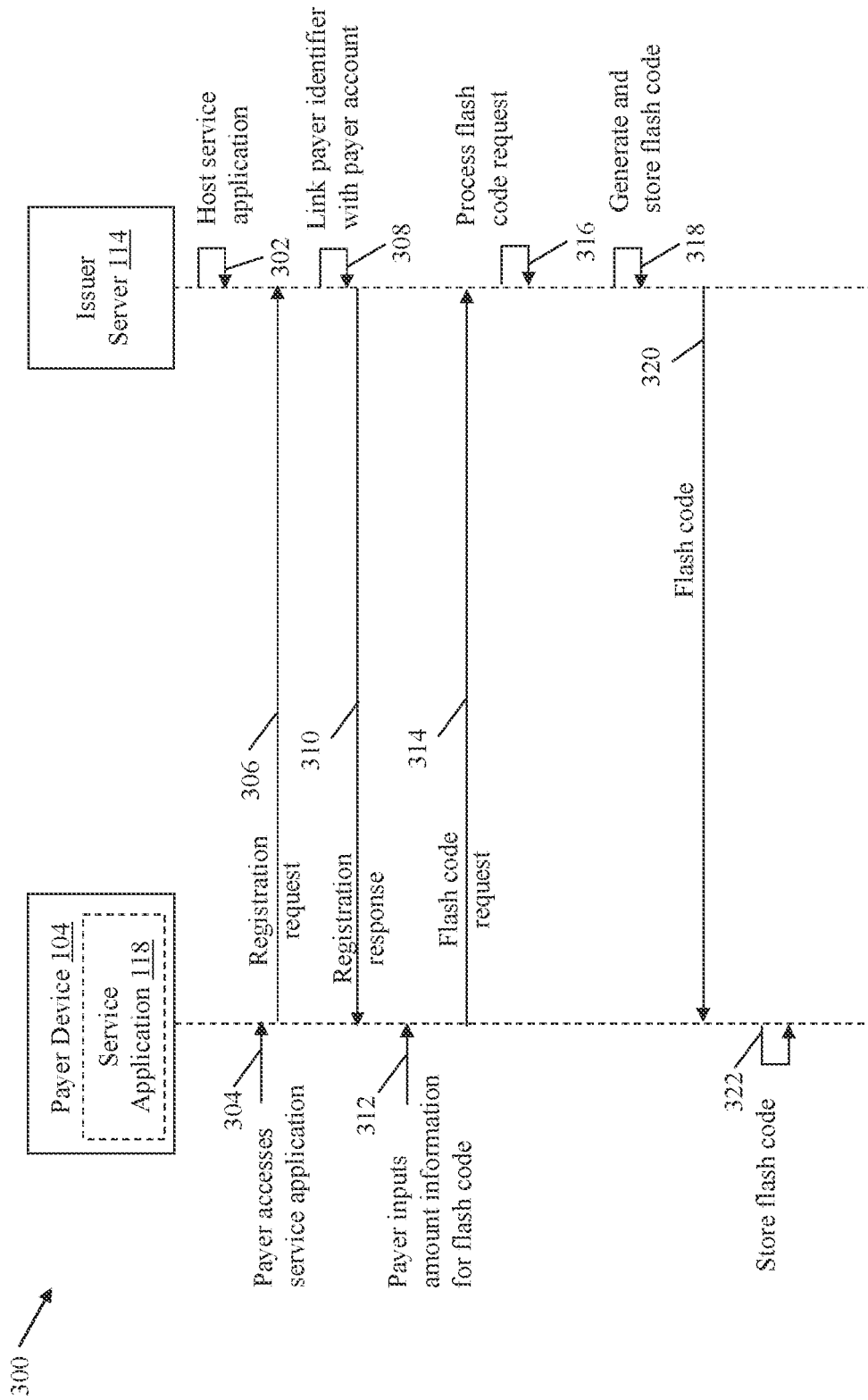
Figure 3C:
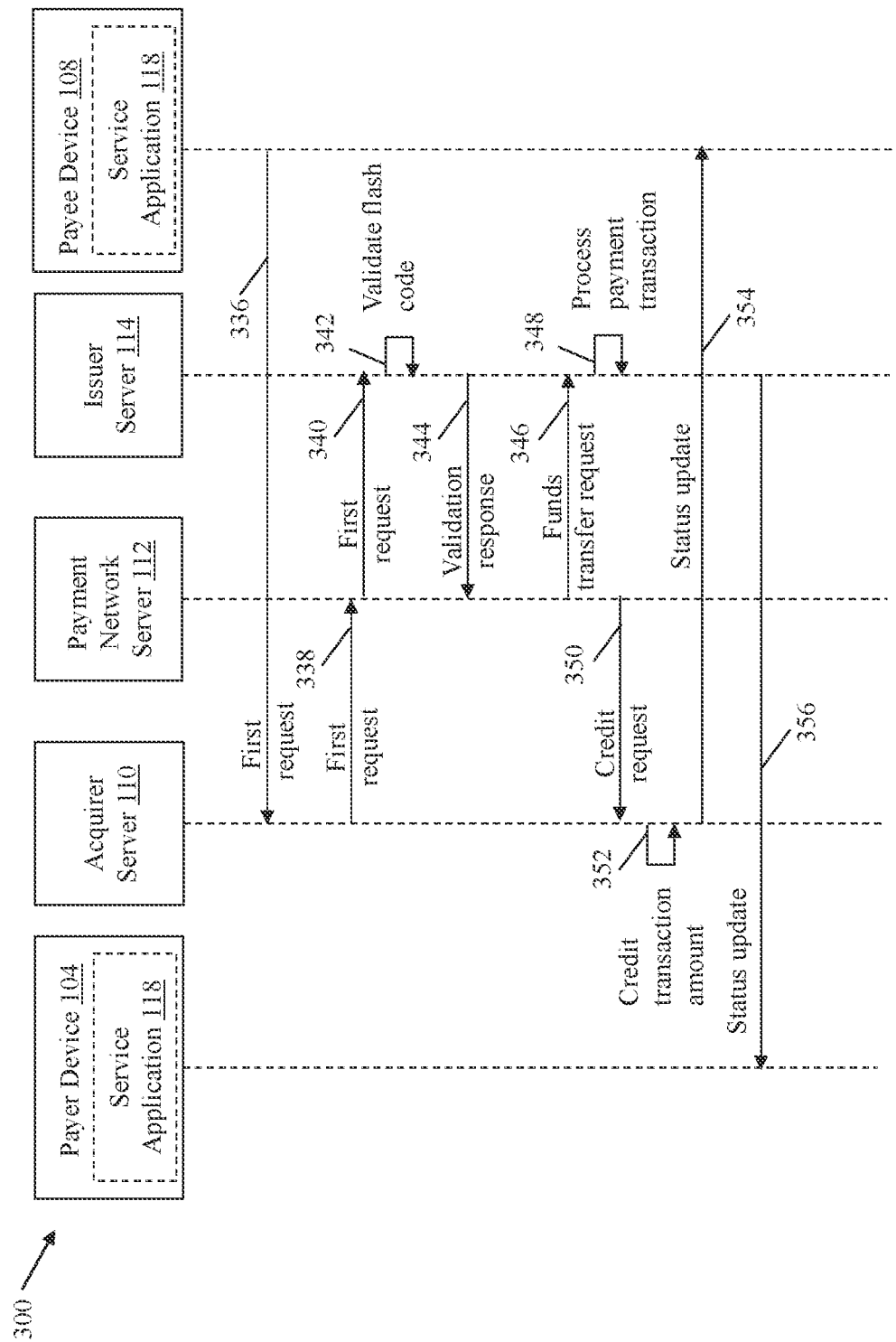

FIGS. 3A, 3B, and 3C, collectively represent a process flow diagram 300 that illustrates facilitation of a secure payment transaction between the payer 102 and the payee 106, in accordance with an exemplary embodiment of the present disclosure. For the sake of ongoing description of FIGS. 3A-3C, it is assumed that the issuer server 114 hosts the service application 118 (as shown by arrow 302).

The payer 102 utilizes the payer device 104 to access the service application 118 running or being executed on the payer device 104 (as shown by arrow 304). In order to register for a payment transaction service offered by the issuer server 114, the payer 102 provides details pertaining to the payer account and the payer identifier (e.g., a registered contact number) to the payer device 104. For example, the UI of the service application 118, presented on the display of the payer device 104, prompts the payer 102 to provide the details of the payer account and the payer identifier.

When the payer 102 successfully submits the details of the payer account and the payer identifier, a registration request is communicated from the payer device 104 executing the service application 118 to the issuer server 114 (as shown by arrow 306). The registration request is indicative of the details of the payer account and the payer identifier. Upon receiving the registration request, the issuer server 114 is configured to link the payer account with the payer identifier (as shown by arrow 308) and register the payer 102 for the payment transaction service. In one embodiment, the issuer server 114 is further configured to maintain a second database that stores data of users (e.g., the payer 102) who have registered for the payment transaction service. For example, when the payer 102 is registered for the payment transaction service, the issuer server 114 updates the second database to store the details of the payer account linked to the payer identifier. For notifying the payer 102 regarding the successful registration, the issuer server 114 is configured to communicate a registration response to the payer device 104 (as shown by arrow 310). In one example, the registration response is communicated to the payer device 104 as a push notification on the service application 118. Upon registration, the payer 102 may avail the payment transaction service through the service application 118 as per requirement. The payment transaction service once enabled allows the payer 102 to perform peer-to-peer digital transactions by requesting a special type of code (i.e., a flash code) from the issuer server 114.

It will be apparent to a person of ordinary skill in the art that registering for the payment transaction service (as shown by arrows 304-310) is a one-time process for the payer 102. Similarly, the payee 106 may also have registered for the payment transaction service with the corresponding acquirer server 110.

The payer 102 accesses the service application 118 to avail the payment transaction service. For example, the UI of the service application 118 may present the flash code option to the payer 102. The payer 102 may select the flash code option to request the issuer server 114 for a fixed amount flash code. Based on the selection of the flash code option by the payer 102, the UI of the service application 118 prompts the payer 102 to input amount information for generating a fixed amount flash code from the payer account. The payer 102 inputs the amount information (for example, $200) to the payer device 104 (as shown by arrow 312). Upon receiving the amount information, the service application 118 executed on the payer device 104 initiates a flash code request that is indicative of the payer identifier and the amount. The flash code request may further include the first flag that is set to indicate the selection of the flash code option. The payer device 104 is configured to communicate the flash code request to the issuer server 114 via the communication network 116 (as shown by arrow 314).

The issuer server 114 receives the flash code request and determines whether the payment transaction service is activated for the payer 102. For example, the issuer server 114 may look-up the second database to determine whether the payment identifier indicated by the flash code request is stored in the second database. When the payment identifier is determined to be stored in the second database, the issuer server 114 establishes that the payment transaction service is activated for the payer 102. The issuer server 114 then processes the flash code request (as shown by arrow 316). During the processing of the flash code request, the issuer server 114 determines whether the payer account of the payer 102 has sufficient funds (e.g., available account balance or credit line) to cover the amount indicated by the flash code request. In one example, the payer account may have insufficient account balance. In such a scenario, the issuer server 114 declines the flash code request and notifies the payer 102. In a non-limiting example, it is assumed that the payer account has sufficient funds (e.g., available account balance or credit line) to cover the amount. In such a scenario, the issuer server 114 approves the flash code request. The issuer server 114 may be further configured to check whether the first flag in the flash code request is set or reset. In a scenario, where the first flag is set, the issuer server 114 is configured to generate the first flash code for the amount specified by the payer 102 (as shown by arrow 318). In other words, the first flash code is generated by the issuer server 114 based on the flash code request and the available account balance of the payer account. In this scenario, the first flash code may include an identifier of the issuer that has generated the first flash code. For example, the first flash code may be a numeric code, an alphabetic code, or a mixed character code that is inclusive of various alphanumeric characters and various special characters, such as @, $, +, =, #, or the like. An example of the first flash code may be "216&sh8dwY23+!Vc". In one embodiment, the first flash code may be of a similar format as regular transaction codes or tokens, such as OTPs, or dynamic tokens, that the issuer server 114 generates for regular transactions. In another embodiment, the first flash code may be of a different format than the regular transaction codes or tokens, such as OTPs, or dynamic tokens, that the issuer server 114 generates for the regular transactions. In such a scenario, the first flag in the flash code request may indicate the issuer server 114 to generate a flash code instead of a regular transaction code. The first flash code is exclusive of the details of the payer account and the payer identifier, and is valid for the first time-interval after the generation. In one example, the first time-interval may be specified by the payer 102 at the time of generating the flash code request. In another embodiment, the first time-interval may be default time interval defined by the issuer server 114. In another embodiment, the first time-interval may be determined based on the amount to be linked with the first flash code. For example, a flash code associated with $500 may have a longer validity as compared to another flash code associated with $100. In one embodiment, the issuer server 114 is configured to block the amount associated with the first flash code from the payer account. The issuer server 114 is further configured to store the generated first flash code in the second database against the payer account of the payer 102 (as shown by arrow 318). The second database may be an exclusive database where different flash codes are stored.

The issuer server 114 is further configured to communicate the first flash code to the payer device 104 (as shown by arrow 320). The payer device 104 presents the received first flash code to the payer 102 and stores the first flash code in a memory thereof (as shown by arrow 322). The first flash code may be received by the payer device 104 as a push notification on the service application 118. In one embodiment, multiple flash codes of different denominations (i.e., different amounts) may be stored in the memory of the payer device 104. The payer 102 may utilize any of the stored flash codes for making payment transactions.

In another embodiment, the flash code request may be communicated to the issuer server 114 from the payer device 104 using unstructured supplementary service data (USSD) technique as described in the foregoing description of FIG. 2A.

With reference to FIG. 3B, the payer 102 accesses the service application 118 for performing a payment transaction with the payee 106. The service application 118 presents the pay by flash option to the payer 102 for performing the payment transaction. The payer 102 selects the pay by flash option (as shown by arrow 324) for performing the payment transaction with the payee 106. Based on the selection of the pay by flash option, the service application 118 identifies various flash codes stored in the memory of the payer device 104 and presents a list of the identified flash codes. Based on the transaction amount of the payment transaction, the payer 102 selects one of the multiple flash codes (as shown by arrow 326). For the sake of ongoing description, it is assumed that the payer 102 selects the first flash code for performing the payment transaction of $200 with the payee 106.

Based on the selection of the first flash code, the service application 118 causes the payer device 104 to generate a flash pattern (for example, the flash pattern 120) that has the selected first flash code encoded therein (as shown by arrow 328). The flash pattern 120 is generated by controlling the flash parameters of the flash generation mechanism based on the first flash code, the environmental factors (such as time of the day, available ambient light in the surroundings of the payer device 104, or the like), and the available battery percentage of the payer device 104. Examples of the flash parameters include, but are not limited to, the ambient exposure compensation, the flash exposure compensation, the flash exposure, the flash ratio, the flash flickering duration, the time interval between each flash of the flash pattern 120, and the flash color of the flash pattern 120. Generation of the flash pattern 120 at the payer device 104 is described in the foregoing description of FIG. 2B.

The flash pattern 120 is emitted by the payer device 104 using the flash generation mechanism (such as the high-brightness LED, the screen flash, or the like) and the emitted flash pattern 120 is communicated to the payee device 108 (as shown by arrow 330). When there exists a line of sight between the payer device 104 and the payee device 108, the payee device 108 captures the emitted flash pattern 120 using the flash capturing mechanism such as a scanner, an image capturing device, or the like (as shown by arrow 332). The service application 118 being executed at the payee device 108 causes the payee device 108 to decode the captured flash pattern 120 and obtain the first flash code (as shown by arrow 334).

With reference to FIG. 3C, when the flash pattern 120 is decoded, the service application 118 being executed on the payee device 108 generates the first request for executing the payment transaction. The first request includes the first flash code obtained by decoding the flash pattern 120, the payee identifier (e.g., the registered mobile number) of the payee 106, and the transaction amount of the payment transaction. The first request may further include the first data element to indicate that the first request includes a flash code (i.e., the first flash code). In one embodiment where the first flash code is a multi-use code, the service application 118 may not allow local storage of the decoded first flash code in a memory of the payee device 108 and the decoded first flash code may not be rendered visible to the payee 106. The payee device 108 is configured to communicate the first request to the acquirer server 110 (as shown by arrow 336). The acquirer server 110 receives the first request. Based on the value of the first data element, the acquirer server 110 identifies that the first request includes a flash code, and thus communicates the first request to the payment network server 112 (as shown by arrow 338).

The payment network server 112 receives the first request and identifies that the first request includes a flash code based on the first data element. The payment network server 112 then identifies the issuer server 114 that is associated with the first request based on the issuer identifier included in the first flash code. The payment network server 112 then communicates the first request to the identified issuer server 114 for validation of the first flash code (as shown by arrow 340). The issuer server 114 receives the first request, and based on the first data element, identifies that the first request includes a flash code. Thus, the issuer server 114 obtains the first flash code from the first request and validates the first flash code (as shown by arrow 342). The issuer server 114 looks-up the second database for validating the first flash code included in the first request. For example, when the first flash code included in the first request is not stored in the second database, the issuer server 114 declares the first flash code included in the first request as invalid and declines the payment transaction. In another example, the issuer server 114 declares the first flash code included in the first request as invalid and declines the payment transaction when the first flash code has expired. In another example, the issuer server 114 declares the first flash code included in the first request as invalid if the transaction amount is greater than the amount associated with the first flash code.

Based on successful validation of the first flash code, the issuer server 114 communicates the validation response to the payment network server 112 (as shown by arrow 344). The validation response indicates a result of validation to the payment network server 112. When the validation response indicates successful validation, the payment network server 112 communicates the funds transfer request to the issuer server 114 (as shown by arrow 346). The funds transfer request includes the details of the payer account, the first data element, and the transaction amount. The issuer server 114 receives the funds transfer request and processes the payment transaction (as shown by arrow 348). For processing the payment transaction, the issuer server 114 deducts the transaction amount from the payer account. The processing (i.e., settlement) of the payment transaction that is based on the first flash code may be different from regular transactions. For example, instead of directly deducting the transaction amount from the payer account, the issuer server 114 is configured to compare the transaction amount with the amount associated with the first flash code. In one example, based on the comparison, the issuer server 114 may identify that the transaction amount is less than the amount associated with the one-time use first flash code. In such scenario, the issuer server 114 deducts the transaction amount from the blocked amount and the difference between the transaction amount and the amount associated with the first flash code is unblocked and made available to the payer 102 for use. In another example, based on the comparison the issuer server 114 may identify that the transaction amount is less than the amount associated with the multi-use first flash code. Thus, the issuer server 114 deducts the transaction amount from the blocked amount and the difference between the transaction amount and the amount associated with the first flash code remains blocked until further use or the expiry of the first flash code.

The payment network server 112 is further configured to communicate a credit request to the acquirer server 110 maintaining the payee account (as shown by arrow 350). The acquirer server 110 receives the credit request and credits the transaction amount to the payee account (as shown by arrow 352). The acquirer server 110 is further configured to communicate status update of the successful completion of the payment transaction to the payee device 108 (as shown by arrow 354) and the issuer server 114 is further configured to communicate the status update of the successful completion of the payment transaction to the payer device 104 (as shown by arrow 356).

In one embodiment, the payee device 108 may be configured to perform batch processing for multiple transactions (i.e., both regular transactions and transactions based on flash codes). In such embodiments, instead of initiating the first request for a single transaction, the payee device 108 may be configured to initiate a batch processing request. The batch processing request may include multiple requests for transactions i.e., both regular transactions and transactions associated with flash codes. Upon receiving the batch processing request, the acquirer server 110 may be configured to communicate the batch processing request to the payment network server 112. The payment network server 112 may be configured to distinguish between regular transactions and flash code-based transactions in the batch processing request based on the first data element included in flash code-based transaction requests. The payment network server 112 may be configured to identify those requests in the batch processing request that are associated with flash codes based on the values of the first data element in such requests. The payment network server 112 may then request the issuer server 114 to validate various flash codes associated with the flash code-based transaction requests. The flash code-based transaction requests are then processed by the issuer server 114 based on the results of validation.

In another embodiment, the payer and payee accounts may be maintained at the same financial institution. In such a scenario, the issuer and the acquirer are the same, and the functions performed by the acquirer server 110 are also performed by the issuer server 114.

In another embodiment, the first request may be communicated to the acquirer server 110 from the payee device 108 using USSD technique as described in the foregoing description of FIG. 2C.

Figure 4:
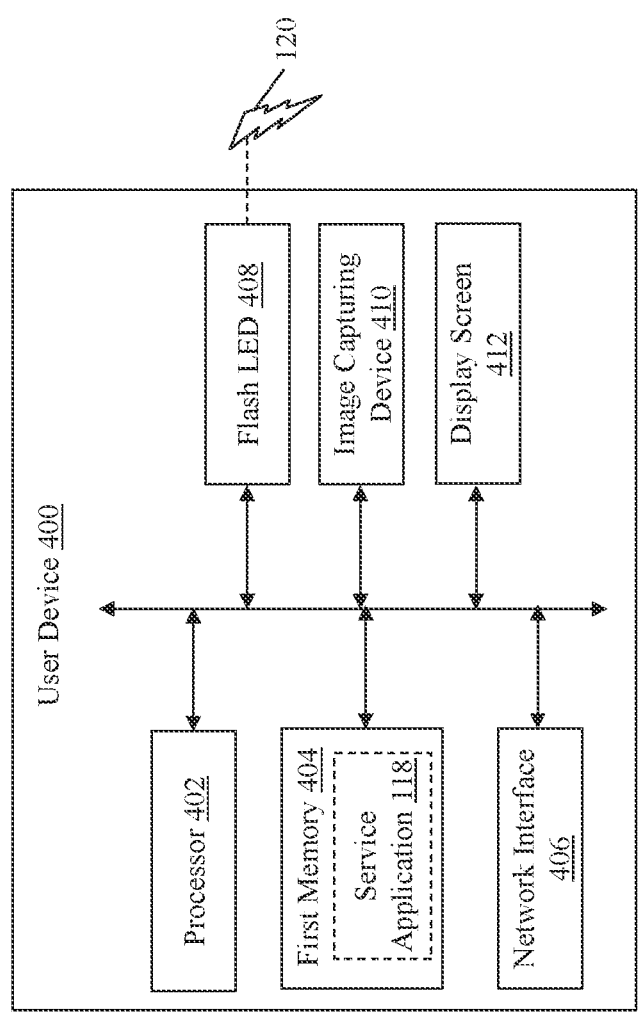
FIG. 4 is a block diagram that illustrates an exemplary user device (e.g., a payer device or a payee device of FIG. 1) for facilitating a secure payment transaction, in accordance with an exemplary embodiment of the present disclosure.

FIG. 4 is a block diagram that illustrates a user device 400 (e.g., the payer device 104 or the payee device 108), in accordance with an embodiment of the present disclosure. The user device 400 includes a processor 402, a first memory 404, a network interface 406, a flash LED 408, an image capturing device 410, and a display screen 412.

The processor 402 includes suitable logic, circuitry, interfaces, and/or code, executed by the circuitry, for controlling various operations of the user device 400. In one example, when the user device 400 is the payer device 104, the processor 402 is configured to translate the first flash code to binary format and determine values of various flash parameters based on the first flash code, the environmental factors, and the available battery percentage of the user device 400 for the generation of the flash pattern 120. In another example, when the user device 400 is the payee device 108, the processor 402 is configured to decode the captured flash pattern 120 to obtain the first flash code for executing the payment transaction. Examples of the processor 402 includes, but are not limited to, an application-specific integrated circuit (ASIC) processor, a reduced instruction set computer (RISC) processor, a complex instruction set computer (CISC) processor, a field programmable gate array (FPGA), a central processing unit (CPU), or a microprocessor.

The first memory 404 includes suitable logic, circuitry, and/or interfaces for storing various instructions or code which when executed by the processor 402 causes the processor 402 to perform corresponding operations. The first memory 404 is configured to store an operating system or a firmware using which the processor 402 operates. In one example, when the user device 400 is the payer device 104, the first memory 404 is configured to store personal data of the payer 102, e.g., images, documents, flash codes, or the like. In one example, when the user device 400 is the payee device 108, the first memory 404 is configured to store personal data of the payee 106, e.g., images, documents, or the like. The first memory 404 is further configured to store application programs of various service applications (e.g., the service application 118) installed on the user device 400. Examples of the first memory 404 includes, but are not limited to, a random-access memory (RAM), a read-only memory (ROM), a removable storage drive, a hard disk drive (HDD), a flash memory, a solid-state memory, or the like.

The network interface 406 includes suitable logic, circuitry, interfaces, and/or code, executed by the circuitry, to transmit and receive data over the communication network 116 using one or more communication network protocols. In one example, when the user device 400 is the payer device 104, the network interface 406 transmits requests and messages to and receives requests and messages from the payment network server 112 and/or the issuer server 114. In another example, when the user device 400 is the payee device 108, the network interface 406 transmits requests and messages to and receives requests and messages from the payment network server 112 and/or the acquirer server 110. Examples of the network interface 406 includes, but are not limited to, an antenna, a radio frequency network interface, a wireless network interface, a Bluetooth network interface, an ethernet port, a universal serial bus (USB) port, or any other device configured to transmit and receive data.

The flash LED 408 is the flash generation mechanism that includes suitable logic, circuitry, interfaces, and/or code, executed by the circuitry, for generating the flash pattern 120. In one embodiment, when the user device 400 is the payer device 104, the flash LED 408 generates and emits the flash pattern 120 based on controlling of the flash parameters, such as the ambient exposure compensation, the flash exposure compensation, the flash exposure, the flash ratio, the flash flickering duration, the time interval between each flash of the flash pattern 120, the flash color of the flash light, or the like. Under the control of the service application 118 and based on the first flash code stored in the first memory 404, the environmental factors, and the available battery percentage of the user device 400, the processor 402 is configured to control the flash parameters of the flash LED 408 for the generation of the flash pattern 120. In embodiment, the flash LED 408 may be configured to emit flash lights of different colors.

The image capturing device 410 includes suitable logic, circuitry, interfaces, and/or code, executed by the circuitry, to capture images and flash patterns. In one example, when the user device 400 is the payee device 108, the image capturing device 410 is configured to record and capture the flash pattern 120 communicated by the payer device 104. The image capturing device 410 may be accessible to the service application 118 based on a consent of the payee 106 and controlled by the processor 402. Examples of the image capturing device 410 includes a camera, an image sensor, or the like.

The display screen 412 includes suitable logic, circuitry, and/or interfaces that are operable to execute one or more instructions stored in the first memory 404 to perform display operations. In one example, the display screen 412 displays one or more UIs of the service application 118. The display screen 412 may be a touch-sensitive display. In one example, when the user device 400 is the payer device 104, the display screen 412 generates and emits the flash pattern 120 based on controlling of the flash parameters (such as the ambient exposure compensation, the flash exposure compensation, the flash exposure, the flash ratio, the flash flickering duration, the time interval between each flash of the flash pattern 120, the flash color of the flash light, or the like) by the processor 402. Examples of the display screen 412 includes, but are not limited to, a thin film transistor liquid crystal display (TFT LCD), an in-plane switching (IPS) LCD, a Resistive Touchscreen LCD, a Capacitive Touchscreen LCD, an organic light emitting diode (OLED), an active-matrix organic light emitting diode (AMOLED), a Super AMOLED, a Retina Display, and a Haptic/Tactile touchscreen.

It will be apparent to a person of ordinary skill in the art that the scope of the user device 400 is not limited to include the components illustrated in FIG. 4. The user device 400 may further include additional components such as a microphone, a clickable button, a rechargeable battery, a charging port, or the like, without deviating from the scope of the disclosure.

Figure 5:
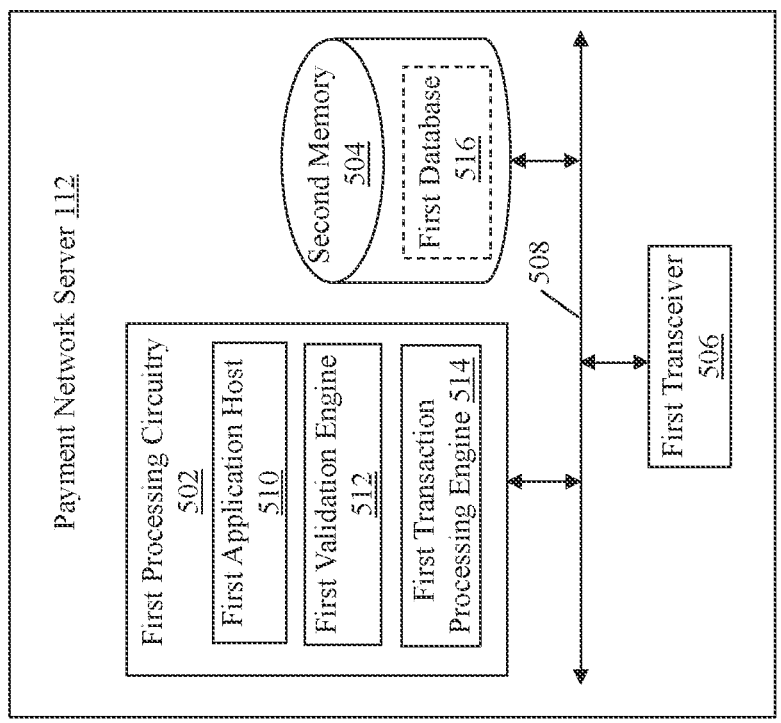
FIG. 5 is a block diagram that illustrates the payment network server of FIG. 1, in accordance with an exemplary embodiment of the present disclosure.

FIG. 5 is a block diagram that illustrates the payment network server 112, in accordance with an exemplary embodiment of the present disclosure. The payment network server 112 includes first processing circuitry 502, a second memory 504, and a first transceiver 506. The first processing circuitry 502, the second memory 504, and the first transceiver 506 communicates with each other by way of a communication bus 508. The first processing circuitry 502 includes a first application host 510, a first validation engine 512, and a first transaction processing engine 514.

The first processing circuitry 502 includes suitable logic, circuitry, interfaces, and/or code, executed by the circuitry, for facilitating peer-to-peer payment transactions by way of flash codes. Examples of the first processing circuitry 502 may include, but are not limited to, an ASIC processor, a RISC processor, a CISC processor, an FPGA, a CPU, or a microprocessor. The first processing circuitry 502 executes various transaction processing operations by way of the first application host 510, the first validation engine 512, and the first transaction processing engine 514.

The second memory 504 includes suitable logic, circuitry, and/or interfaces to store various instructions or code which when executed by the first processing circuitry 502 causes the first processing circuitry 502 to perform the transaction processing operations. The second memory 504 further stores the first database (hereinafter, referred to and designated as "the first database 516"). The first database 516 may be a tabular database or a graphical database that stores details of those users (e.g., the payer 102 and the payee 106) who have registered for the payment transaction service offered by the payment network server 112. In one example, the first database 516 includes a first record that indicates that the payer 102 having the payer identifier, e.g., '1234567890' have registered for the payment transaction service. The first record further indicates the payer account linked to the payer identifier '1234567890'. The first record further includes details of various flash codes (e.g., the first flash code) that have been communicated to the payer device 104 based on flash code requests initiated by the payer 102. Examples of the second memory 504 may include a RAM, a ROM, a removable storage drive, an HDD, a flash memory, a solid-state memory, or the like. It will be apparent to a person skilled in the art that the scope of the disclosure is not limited to realizing the second memory 504 in the payment network server 112, as described herein. In another embodiment, the second memory 504 may be realized in form of a database server or a cloud storage working in conjunction with the payment network server 112, without departing from the scope of the disclosure.

The first transceiver 506 includes suitable logic, circuitry, interfaces, and/or code, executable by the circuitry, to transmit and receive data over the communication network 116 using one or more communication network protocols. The first transceiver 506 transmits requests and messages to and receives requests and messages from the payer and payee devices 104 and 108, the acquirer server 110, and the issuer server 114 (as described in conjunction with FIGS. 1-3C). Examples of the first transceiver 506 includes, but are not limited to, an antenna, a radio frequency transceiver, a wireless transceiver, a Bluetooth transceiver, an ethernet port, a USB port, or any other device configured to transmit and receive data.

In one embodiment, the first application host 510 is configured to host the service application 118 which is executable on various user devices, e.g., the payer and payee devices 104 and 108, and the user device 400. The first application host 510 is further configured to generate updates for introducing new functionalities and fixing previous bugs in the service application 118. The first application host 510 is further configured to receive the flash code request from the payer device 104 and the first request from the payee device 108.

The first validation engine 512 is configured to validate flash codes received from payees for execution of payment transactions. For example, the first validation engine 512 validates the first flash code included in the first request by comparing with the first flash code stored in the first database 516.

The first transaction processing engine 514 generates funds transfer and credit requests based on validation of flash codes (e.g., the first flash code). In one embodiment, when the first flash code is determined to be invalid by the first validation engine 512, the first transaction processing engine 514 declines the payment transaction. The funds transfer request is communicated to the issuer server 114 and the credit request is communicated to the acquirer server 110 of the corresponding payment transaction. The first transaction processing engine 514 further generates status updates to be communicated to the payer 102 and the payee 106 for the payment transaction.

Figure 6:
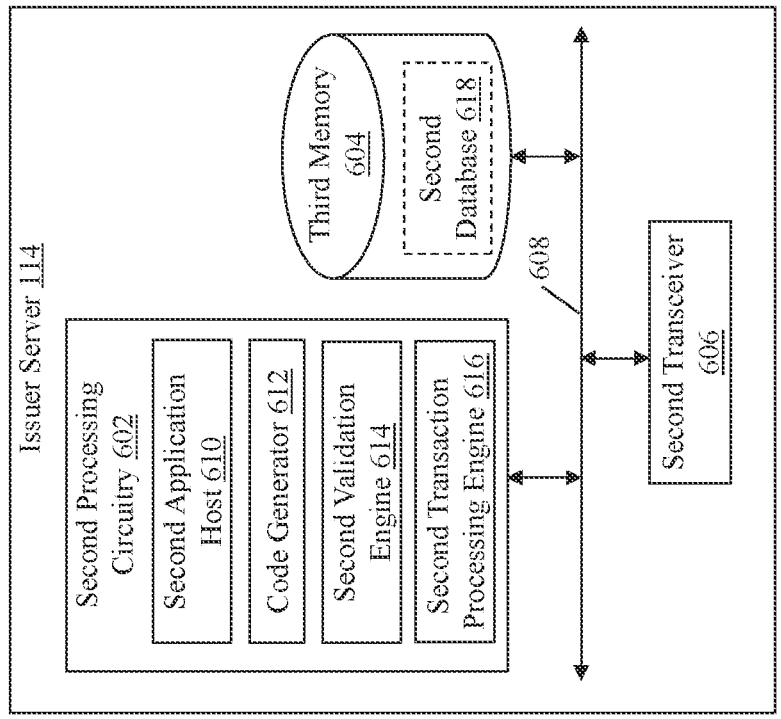
FIG. 6 is a block diagram that illustrates the issuer server of FIG. 1, in accordance with an exemplary embodiment of the present disclosure.

FIG. 6 is a block diagram that illustrates the issuer server 114, in accordance with an exemplary embodiment of the present disclosure. The issuer server 114 includes second processing circuitry 602, a third memory 604, and a second transceiver 606. The second processing circuitry 602, the third memory 604, and the second transceiver 606 communicates with each other by way of a communication bus 608. The second processing circuitry 602 includes a second application host 610, a code generator 612, a second validation engine 614, and a second transaction processing engine 616.

The second processing circuitry 602 includes suitable logic, circuitry, interfaces, and/or code, executed by the circuitry, for facilitating peer-to-peer payment transactions by way of flash codes. Examples of the second processing circuitry 602 may include, but are not limited to, an ASIC processor, a RISC processor, a CISC processor, an FPGA, a CPU, or a microprocessor. The second processing circuitry 602 executes various transaction processing operations by way of the second application host 610, the code generator 612, the second validation engine 614, and the second transaction processing engine 616.

The third memory 604 includes suitable logic, circuitry, and/or interfaces to store various instructions or code which when executed by the second processing circuitry 602 causes the second processing circuitry 602 to perform the transaction processing operations. The third memory 604 further stores the second database (hereinafter, referred to and designated as "the second database 618"). The second database 618 may be a tabular database or a graphical database that stores details of those account holders (e.g., the payer 102) who have registered for the payment transaction service offered by the issuer server 114. In one example, the second database 618 includes a second record that indicates that the payer 102 having the payer identifier, e.g., '1234567890' have registered for the payment transaction service. The second record further indicates the payer account linked to the payer identifier '1234567890'. The second record further includes details of various flash codes (e.g., the first flash code) that have been communicated to the payer device 104 based on flash code requests initiated by the payer 102. Examples of the third memory 604 may include a RAM, a ROM, a removable storage drive, an HDD, a flash memory, a solid-state memory, or the like. It will be apparent to a person skilled in the art that the scope of the disclosure is not limited to realizing the third memory 604 in the issuer server 114, as described herein. In another embodiment, the third memory 604 may be realized in form of a database server or a cloud storage working in conjunction with the issuer server 114, without departing from the scope of the disclosure.

The second transceiver 606 includes suitable logic, circuitry, interfaces, and/or code, executable by the circuitry, to transmit and receive data over the communication network 116 using one or more communication network protocols. The second transceiver 606 transmits requests and messages to and receives requests and messages from the payer device 104 and the payment network server 112 (as described in conjunction with FIGS. 1-3C). Examples of the second transceiver 606 includes, but are not limited to, an antenna, a radio frequency transceiver, a wireless transceiver, a Bluetooth transceiver, an ethernet port, a USB port, or any other device configured to transmit and receive data.

In another embodiment, the second application host 610 is configured to host the service application 118 which is executable on various user devices, e.g., the payer device 104 and the user device 400. The second application host 610 is further configured to generate updates for introducing new functionalities and fixing previous bugs in the service application 118. The second application host 610 is further configured to receive the flash code request initiated using the service application 118 from the payer device 104.

The code generator 612 generates the first flash code based on the flash code request initiated by the payer 102 and the available account balance in the payer account. The code generator 612 generates a flash code for every flash code request. For example, the generated flash code may be a numeric code, an alphabetic code, or a mixed character code that is inclusive of various alphanumeric characters and various special characters, such as @, $, +, =, #, or the like. In one embodiment, the generated flash code may be of a similar format as regular transaction codes or tokens, such as OTPs, or dynamic tokens. In another embodiment, the generated flash code may be of a different format than the regular transaction codes or tokens, such as OTPs, or dynamic tokens. In a scenario where the available account balance in the payer account is not sufficient to cover the amount associated with the flash code request, the code generator 612 declines the flash code request. The generated first flash code is either directly communicated to the payer device 104 by the issuer server 114 or by way of the payment network server 112.

The second validation engine 614 is configured to validate flash codes received from payees for execution of payment transactions. For example, the second validation engine 614 validates the first flash code included in the first request by comparing with the first flash code stored in the second database 618.

The second transaction processing engine 616 processes the payment transaction based on validation of the first flash code. For example, the second transaction processing engine 616 deducts the transaction amount from the payer account for processing the payment transaction. In one embodiment, the second transaction processing engine 616 unblocks remaining amount associated with the first flash code after the processing of the payment transaction. The second transaction processing engine 616 further generates status update to be communicated to the payer 102 for the payment transaction.

Figure 7:
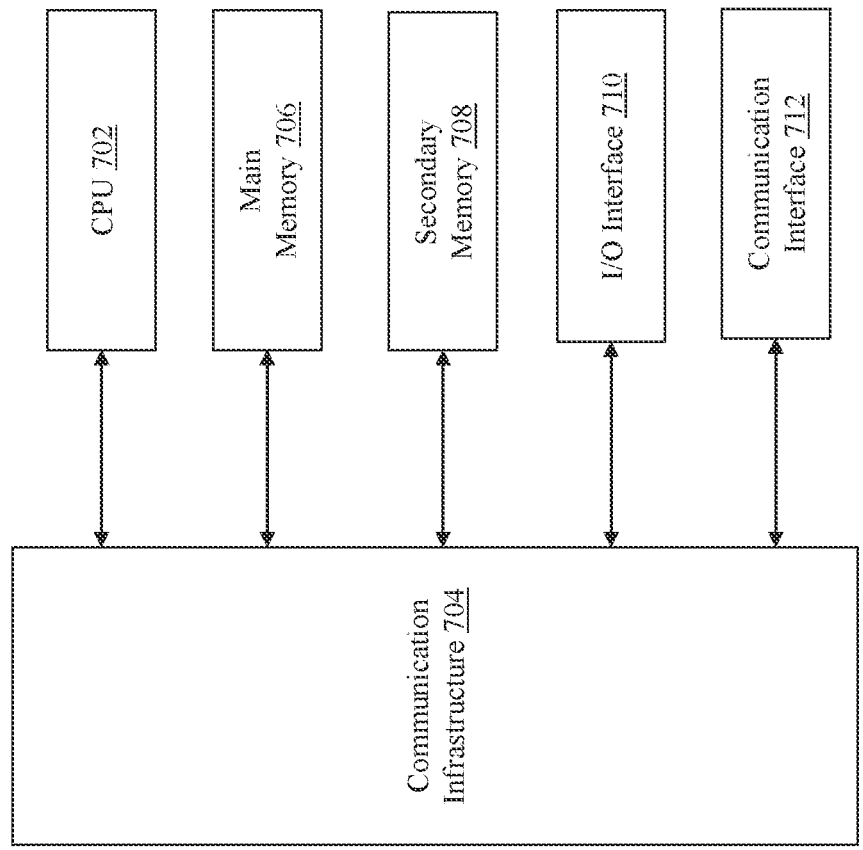
FIG. 7 is a block diagram that illustrates a system architecture of a computer system, in accordance with an exemplary embodiment of the present disclosure.

FIG. 7 is a block diagram that illustrates a system architecture of a computer system 700, in accordance with an embodiment of the present disclosure. An embodiment of present disclosure, or portions thereof, may be implemented as computer readable code on the computer system 700. In one example, the payer and payee devices 104 and 108, the acquirer server 110, the payment network server 112, and the issuer server 114 may be implemented as the computer system 700. Hardware, software, or any combination thereof may embody modules and components used to implement the methods of FIGS. 8A-8B, 9A-9B, 10, and 11.

The computer system 700 includes a CPU 702 that may be a special-purpose or a general-purpose processing device. The CPU 702 may be a single processor, multiple processors, or combinations thereof. The CPU 702 may have one or more processor cores. In one example, the CPU 702 is an octa-core processor. Further, the CPU 702 may be connected to a communication infrastructure 704, such as a bus, message queue, multi-core message-passing scheme, and the like. The computer system 700 may further include a main memory 706 and a secondary memory 708. Examples of the main memory 706 may include RAM, ROM, and the like. The secondary memory 708 may include a hard disk drive or a removable storage drive, such as a floppy disk drive, a magnetic tape drive, a compact disc, an optical disk drive, a flash memory, and the like.

The computer system 700 further includes an input/output (I/O) interface 710 and a communication interface 712. The I/O interface 710 includes various input and output devices that are configured to communicate with the CPU 702. Examples of the input devices may include a keyboard, a mouse, a joystick, a touchscreen, a microphone, and the like. Examples of the output devices may include a display screen, a speaker, headphones, and the like. The communication interface 712 may be configured to allow data to be transferred between the computer system 700 and various devices that are communicatively coupled to the computer system 700. Examples of the communication interface 712 may include a modem, a network interface, i.e., an Ethernet card, a communication port, and the like. Data transferred via the communication interface 712 may correspond to signals, such as electronic, electromagnetic, optical, or other signals as will be apparent to a person skilled in the art.

Figure 8A:
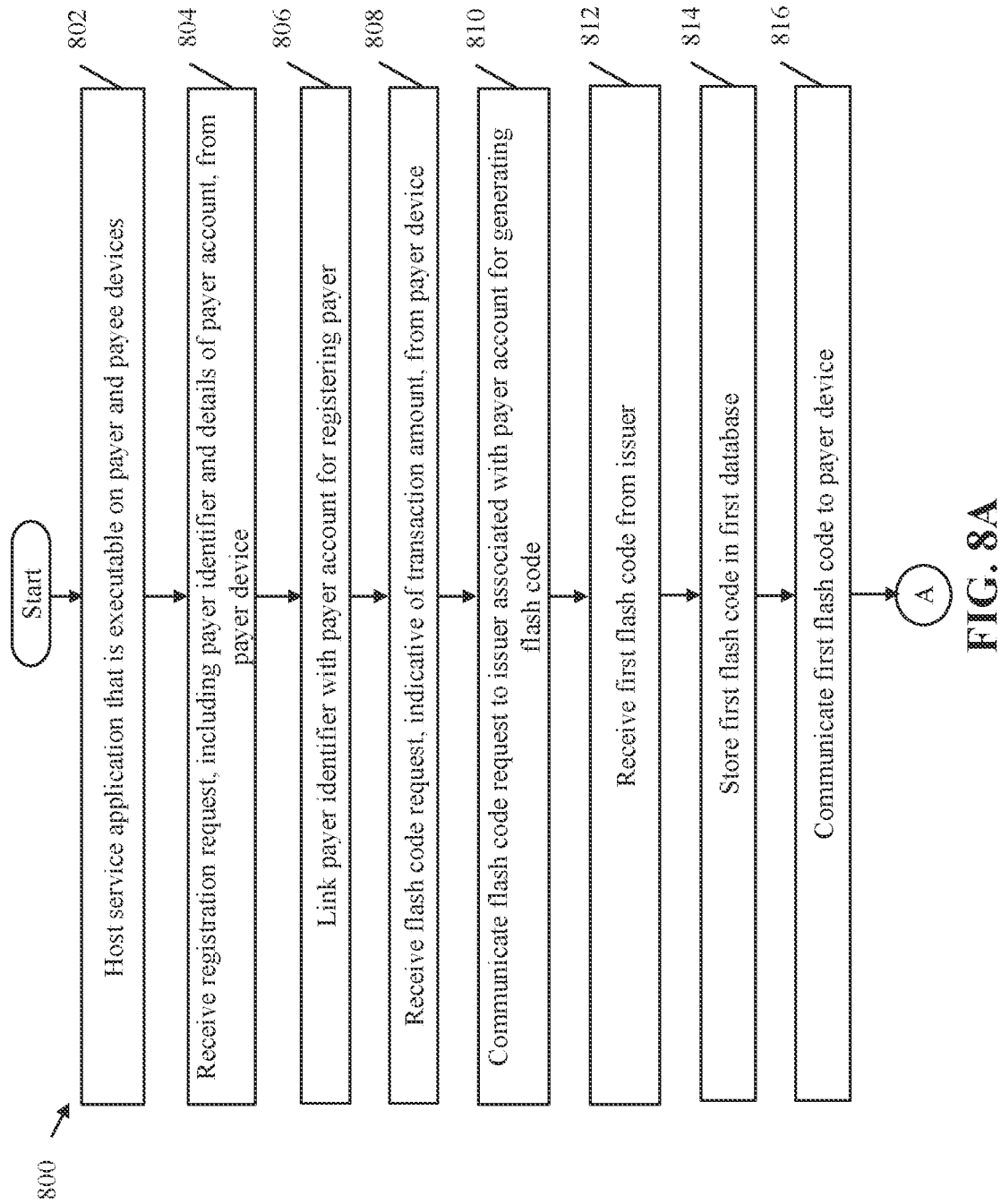
FIGS. 8A and 8B, collectively represent a flowchart that illustrates a method for facilitating a secure payment transaction between the payer and the payee, in accordance with an exemplary embodiment of the present disclosure.
Figure 8B:
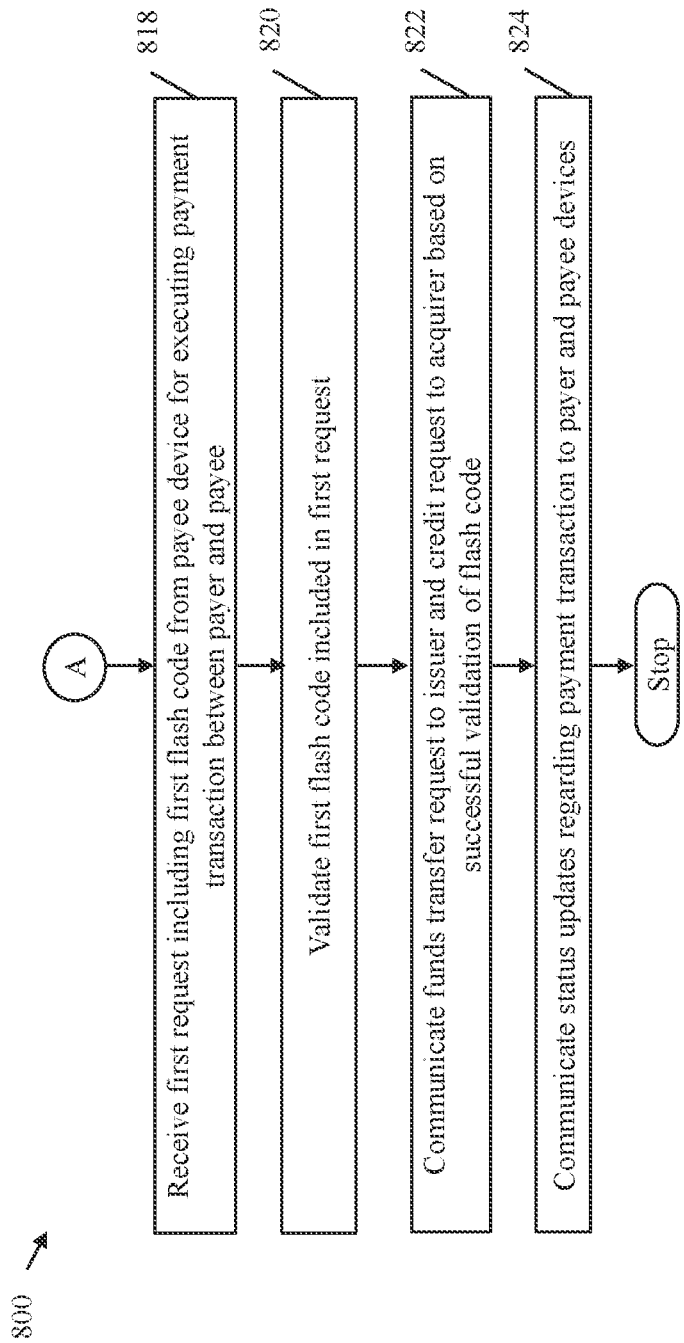

FIGS. 8A and 8B, collectively represent a flowchart 800 that illustrates a method for facilitating a secure payment transaction.

With reference to FIG. 8A, at step 802, the service application 118 that is executable on the payer and payee devices 104 and 108 is hosted by the payment network server 112. At step 804, the registration request including details of the payer account and the payer identifier is received by the payment network server 112 from the payer device 104. The registration request is initiated by the payer 102 using the service application 118 being executed on the payer device 104. At step 806, the payer identifier is linked with the details of the payer account by the payment network server 112 for registering the payer 102 for the payment transaction service. At step 808, the flash code request associated with a transaction amount is received by the payment network server 112 from the payer device 104. The flash code request is initiated by the payer 102 using the service application 118 being executed on the payer device 104. At step 810, the flash code request is communicated by the payment network server 112 to the issuer (i.e., the issuer server 114) associated with the payer account for generating the flash code. At step 812, the first flash code is received by the payment network server 112 from the issuer (i.e., the issuer server 114). At step 814, the first flash code is stored in the first database 516 by the payment network server 112. At step 816, the first flash code associated with the transaction amount is communicated by the payment network server 112 to the payer device 104.

With reference to FIG. 8B, when the payer 102 wants to perform a payment transaction with the payee 106, the first flash code is encoded into the flash pattern 120 at the payer device 104 and communicated to the payee device 108. The payee device 108 captures the flash pattern 120 and decodes the captured flash pattern 120 to obtain the first flash code. The first flash code is then communicated to the payment network server 112 by the payee 106 for executing the payment transaction between the payer 102 and the payee 106. At step 818, the first request including the first flash code is received by the payment network server 112 from the payee device 108 for executing the payment transaction between the payer 102 and the payee 106. The first request is further indicative of the transaction amount of the payment transaction and the first data element that distinguishes the first request from regular transaction requests. At step 820, the first flash code included in the first request is validated by the payment network server 112. At step 822, based on successful validation of the first flash code, the funds transfer request is communicated to the issuer and the credit request is communicated to the acquirer, by the payment network server 112 for processing the payment transaction. At step 824, status updates regarding the payment transaction are communicated to the payer and payee devices 104 and 108.

Figure 9A:
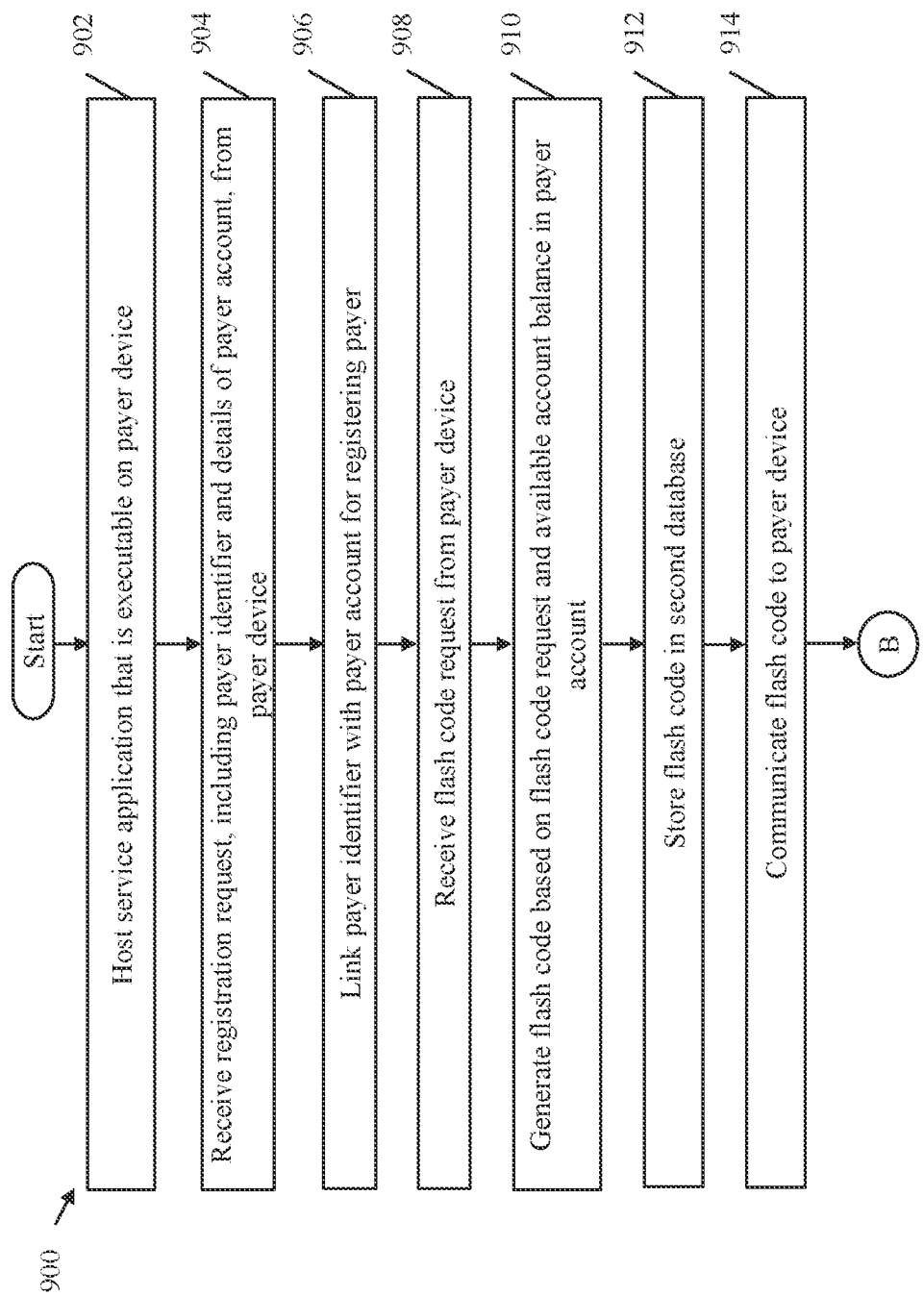
FIGS. 9A and 9B, collectively represent a flowchart that illustrates a method for facilitating a secure payment transaction between the payer and the payee, in accordance with another exemplary embodiment of the present disclosure.
Figure 9B:
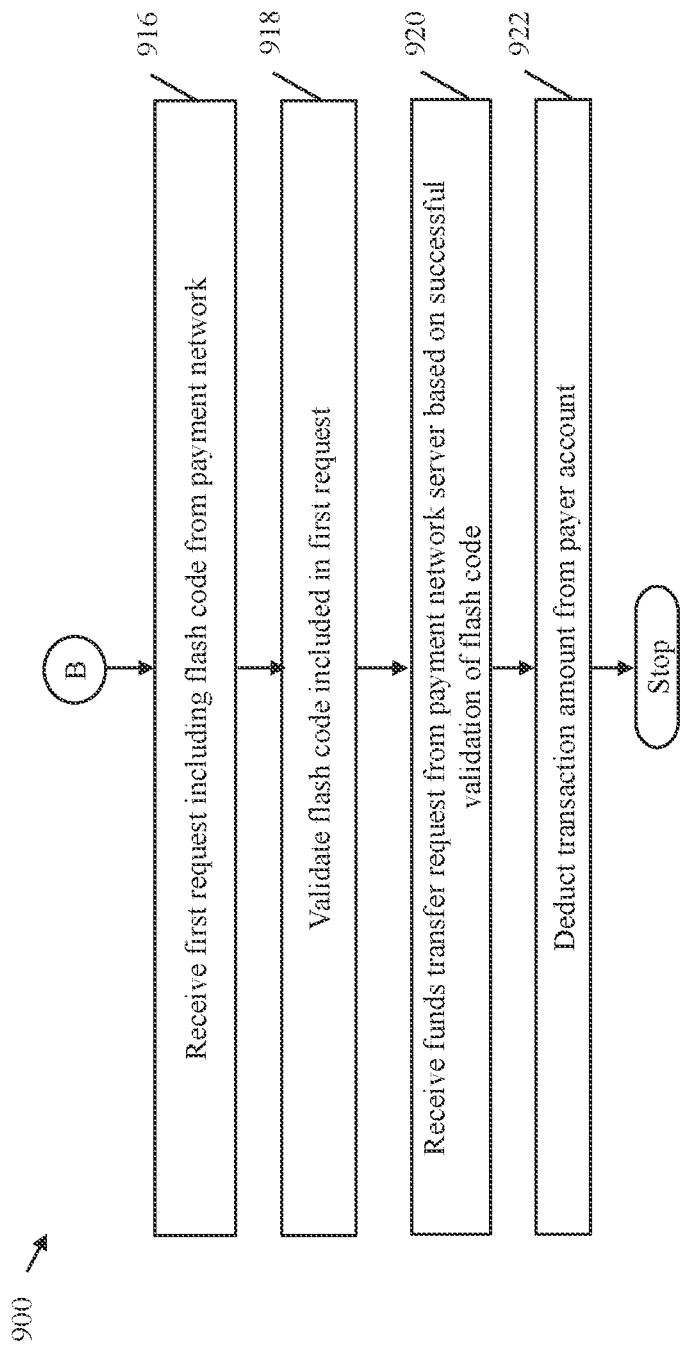

FIGS. 9A and 9B, collectively represent a flowchart 900 that illustrates a method for facilitating a secure payment transaction, in accordance with another exemplary embodiment of the present disclosure.

With reference to FIG. 9A, at step 902, the service application 118 that is executable on the payer device 104 is hosted by the issuer server 114. At step 904, the registration request including details of the payer account and the payer identifier is received by the issuer server 114 from the payer device 104. The registration request is initiated by the payer 102 using the service application 118 being executed on the payer device 104. At step 906, the payer identifier is linked with the details of the payer account by the issuer server 114 for registering the payer 102 for the payment transaction service. At step 908, the flash code request associated with a transaction amount is received by the issuer server 114 from the payer device 104. The flash code request is initiated by the payer 102 using the service application 118 being executed on the payer device 104. At step 910, the first flash code is generated by the issuer server 114 based on the flash code request and the available account balance in the payer account. At step 912, the first flash code is stored in the second database 618 by the issuer server 114. At step 914, the first flash code associated with the transaction amount is communicated by the issuer server 114 to the payer device 104.

With reference to FIG. 9B, when the payer 102 wants to perform a payment transaction with the payee 106, the first flash code is encoded into the flash pattern 120 at the payer device 104 and communicated to the payee device 108. The payee device 108 captures the flash pattern 120 and decodes the captured flash pattern 120 to obtain the first flash code. The first flash code is then communicated to the issuer server 114 by way of the acquirer server 110 and the payment network server 112 channel for executing the payment transaction between the payer 102 and the payee 106.

At step 916, the first request including the first flash code is received by the issuer server 114 from the payee device 108 via the acquirer server 110 and the payment network server 112 channel for executing the payment transaction between the payer 102 and the payee 106. The first request is further indicative of the transaction amount of the payment transaction and the first data element that distinguishes the first request from regular transaction requests. At step 918, the first flash code included in the first request is validated by the issuer server 114. At step 920, based on successful validation of the first flash code, the funds transfer request is received by the issuer server 114 from the payment network server 112 for processing the payment transaction. At step 922, the transaction amount is deducted from the payer account by the issuer server 114.

Figure 10:
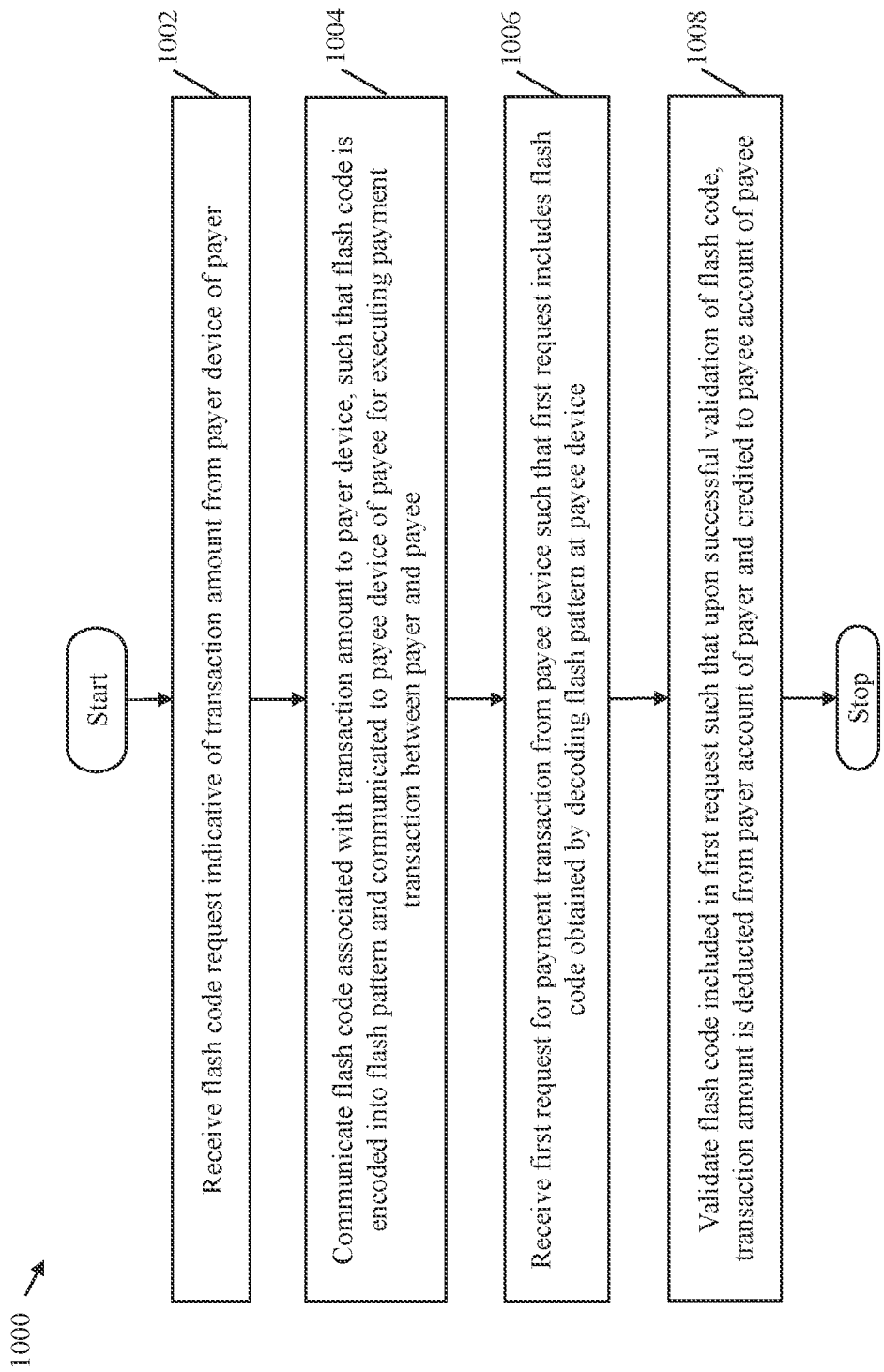
FIG. 10 is a high-level flow chart that illustrates a method for facilitating a secure payment transaction, in accordance with an exemplary embodiment of the present disclosure.

FIG. 10 is a high-level flow chart 1000 that illustrates a method for facilitating a secure payment transaction, in accordance with an exemplary embodiment of the present disclosure. At step 1002, a flash code request associated with a transaction amount is received by a server (e.g., the payment network server 112 or the issuer server 114) from the payer device 104. At step 1004, a flash code associated with the transaction amount is communicated by the server (e.g., the payment network server 112 or the issuer server 114) to the payer device 104. The flash code is encoded into the flash pattern 120 at the payer device 104 and communicated to the payee device 108 for executing a payment transaction between the payer 102 and the payee 106. At step 1006, the first request for the payment transaction is received by the server (e.g., the payment network server 112 or the issuer server 114) from the payee device 108. The first request includes the flash code that is obtained by decoding the flash pattern 120 at the payee device 108. At step 1008, the flash code included in the first request is validated by the server (e.g., the payment network server 112 or the issuer server 114). Based on successful validation of the flash code included in the first request, the transaction amount is deducted from the payer account and credited to the payee account of the payee 106.

Figure 11:
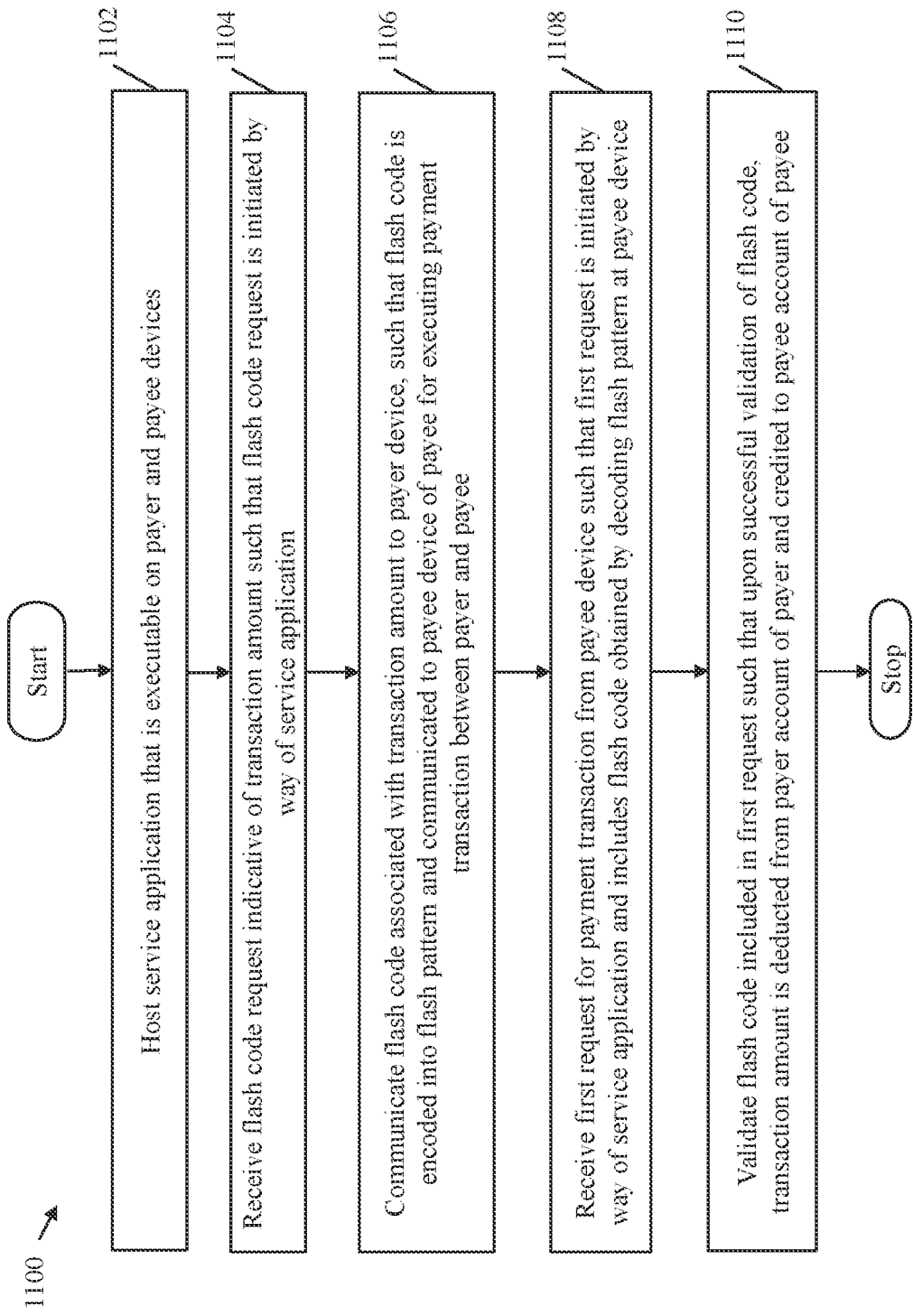
FIG. 11 is a high-level flow chart that illustrates a method for facilitating a secure payment transaction, in accordance with another exemplary embodiment of the present disclosure.

FIG. 11 is a high-level flow chart 1100 that illustrates a method for facilitating a secure payment transaction, in accordance with another exemplary embodiment of the present disclosure. At step 1102, the service application 118 executable on the payer and payee devices 104 and 108 is hosted by the payment network server 112. The payment network server 112 is distinct from the issuer of the payer account of the payer 102. At step 1104, a flash code request associated with a transaction amount is received by the payment network server 112 from the payer device 104. The flash code request is initiated by way of the service application 118. At step 1106, a flash code associated with the transaction amount is communicated by the payment network server 112 to the payer device 104. The flash code is encoded into the flash pattern 120 at the payer device 104 and communicated to the payee device 108 for executing a payment transaction between the payer 102 and the payee 106. At step 1108, the first request for the payment transaction is received by the payment network server 112 from the payee device 108. The first request is initiated by way of the service application 118 and includes the flash code that is obtained by decoding the flash pattern 120 at the payee device 108. At step 1110, the flash code included in the first request is validated by the payment network server 112. Based on successful validation of the flash code included in the first request, the payment transaction is processed, and the transaction amount is deducted from the payer account and credited to the payee account of the payee 106.

Technical improvements in the payment network server 112 or the issuer server 114 have enabled payment transactions to be performed through flash codes that do not contain any personal information, such as account details or payment identifiers, of payers or payees. By enabling the payment transactions through such flash codes, the payment network server 112 or the issuer server 114 has eliminated the need to share the payer and payee identifiers between the payer 102 and the payee 106 for performing a digital payment transaction. Further, in one embodiment, the service application 118 at the payee device 108 ensures that the first flash code obtained by decoding the captured flash pattern 120 is neither revealed to the payee 106 nor stored locally at the payee device 108. Thus, misuse of multi-use flash codes at payee's end is prevented. Since the first flash code is communicated to the payee device 108 by way of the flash pattern 120, any bystander may not be able to fraudulently overhear or obtain the first flash code from the payer 102. Further, the flash pattern 120 is communicated from the payer device 104 to the payee device 108 when a line of sight exists between the payer and payee devices 104 and 108, thus, a likelihood of data theft due to man in the middle attack is considerably reduced.

Techniques consistent with the present disclosure provide, among other features, systems and methods for facilitating secure payment transactions. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

In the claims, the words 'comprising', 'including' and 'having' do not exclude the presence of other elements or steps then those listed in a claim. The terms "a" or "an," as used herein, are defined as one or more than one. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

We claim:

1. A method for facilitating payment transactions, the method comprising:
   receiving, by a server from a payer device of a payer, a flash code request indicative of a transaction amount;
   communicating, by the server, based on the flash code request, a flash code associated with the transaction amount to the payer device, wherein the flash code is encoded into a flash pattern at the payer device and communicated to a payee device of a payee for executing a payment transaction between the payer and the payee;
   receiving, by the server, a first request for the payment transaction from the payee device, wherein the first request includes the flash code obtained by decoding the flash pattern at the payee device; and
   validating, by the server, the flash code included in the first request, wherein based on successful validation of the flash code, the transaction amount is deducted from a payer account of the payer and credited to a payee account of the payee.

2. The method of claim 1, further comprising hosting, by the server, a service application that is executable on the payer device and the payee device, wherein the flash code request is initiated by way of the service application executed at the payer device and the first request is initiated by way of the service application executed at the payee device.

3. The method of claim 2, wherein the flash code is encoded into the flash pattern by controlling one or more flash parameters based on the flash code, one or more environmental factors, and available battery percentage of the payer device, and wherein the one or more flash parameters include at least one of an ambient exposure compensation, a flash exposure compensation, a flash exposure, a flash ratio, a flash flickering duration, a flash color, and a time interval between each flash of the flash pattern.

4. The method of claim 3, further comprising generating, by the server, the flash code for communicating to the payer device based on the flash code request and an available account balance of the payer account.

5. The method of claim 4, further comprising:
   receiving, by the server, a registration request from the payer device, wherein the registration request includes one or more details of the payer account and a payer identifier; and
   registering, by the server, the payer by linking the payer account with the payer identifier, wherein the flash code request is further indicative of the payer identifier linked to the payer account.

6. The method of claim 5, wherein the flash code is valid for a first time-interval and expires after the first time-interval, and wherein the flash code is exclusive of one or more details of the payer account and a payer identifier of the payer and inclusive of a plurality of alphanumeric characters and one or more special characters.

7. The method of claim 2, further comprising generating, by the server, the flash code for communicating to the payer device based on the flash code request and an available account balance of the payer account.

8. The method of claim 2, further comprising:
   receiving, by the server, a registration request from the payer device, wherein the registration request includes one or more details of the payer account and a payer identifier; and
   registering, by the server, the payer by linking the payer account with the payer identifier, wherein the flash code request is further indicative of the payer identifier linked to the payer account.

9. The method of claim 1, wherein the flash code is encoded into the flash pattern by controlling one or more flash parameters based on the flash code, one or more environmental factors, and available battery percentage of the payer device, and wherein the one or more flash parameters include at least one of an ambient exposure compensation, a flash exposure compensation, a flash exposure, a flash ratio, a flash flickering duration, a flash color, and a time interval between each flash of the flash pattern.

10. The method of claim 1, further comprising generating, by the server, the flash code for communicating to the payer device based on the flash code request and an available account balance of the payer account.

11. The method of claim 1, further comprising:
    receiving, by the server, a registration request from the payer device, wherein the registration request includes one or more details of the payer account and a payer identifier; and
    registering, by the server, the payer by linking the payer account with the payer identifier, wherein the flash code request is further indicative of the payer identifier linked to the payer account.

12. The method of claim 1, wherein the flash code is valid for a first time-interval and expires after the first time-interval, and wherein the flash code is exclusive of one or more details of the payer account and a payer identifier of the payer and inclusive of a plurality of alphanumeric characters and one or more special characters.

13. A system for facilitating payment transactions, the system comprising:
    a server configured to:
    receive, from a payer device of a payer, a flash code request indicative of a transaction amount;
    communicate, based on the flash code request, a flash code associated with the transaction amount to the payer device, wherein the flash code is encoded into a flash pattern at the payer device and communicated to a payee device of a payee for executing a payment transaction between the payer and the payee;
    receive a first request for the payment transaction from the payee device, wherein the first request includes the flash code obtained by decoding the flash pattern at the payee device; and validate the flash code included in the first request, wherein based on successful validation of the flash code, the transaction amount is deducted from a payer account of the payer and credited to a payee account of the payee.

14. The system of claim 13, wherein the server is further configured to host a service application that is executable on the payer device and the payee device, wherein the flash code request is initiated by way of the service application executed at the payer device and the first request is initiated by way of the service application executed at the payee device.

15. The system of claim 14, wherein the flash code is encoded into the flash pattern by controlling one or more flash parameters based on the flash code, one or more environmental factors, and available battery percentage of the payer device and wherein the one or more flash parameters include at least one of an ambient exposure compensation, a flash exposure compensation, a flash exposure, a flash ratio, a flash flickering duration, a flash color, and a time interval between each flash of the flash pattern.

16. The system of claim 15, wherein the flash code is valid for a first time-interval and expires after the first time-interval, and wherein the flash code is exclusive of one or more details of the payer account and a payer identifier of the payer and inclusive of a plurality of alphanumeric characters and one or more special characters.

17. The system of claim 14, wherein the flash code is valid for a first time-interval and expires after the first time-interval, and wherein the flash code is exclusive of one or more details of the payer account and a payer identifier of the payer and inclusive of a plurality of alphanumeric characters and one or more special characters.

18. The system of claim 13, wherein the flash code is encoded into the flash pattern by controlling one or more flash parameters based on the flash code, one or more environmental factors, and available battery percentage of the payer device and wherein the one or more flash parameters include at least one of an ambient exposure compensation, a flash exposure compensation, a flash exposure, a flash ratio, a flash flickering duration, a flash color, and a time interval between each flash of the flash pattern.

19. The system of claim 18, wherein the flash code is valid for a first time-interval and expires after the first time-interval, and wherein the flash code is exclusive of one or more details of the payer account and a payer identifier of the payer and inclusive of a plurality of alphanumeric characters and one or more special characters.

20. The system of claim 13, wherein the flash code is valid for a first time-interval and expires after the first time-interval, and wherein the flash code is exclusive of one or more details of the payer account and a payer identifier of the payer and inclusive of a plurality of alphanumeric characters and one or more special characters.

* * * * *